(12) United States Patent
Matsumoto et al.

(10) Patent No.: US 7,367,575 B2
(45) Date of Patent: May 6, 2008

(54) ARRANGEMENT STRUCTURE OF SPEED-CHANGE CABLE

(75) Inventors: Shinya Matsumoto, Saitama (JP); Naoki Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 257 days.

(21) Appl. No.: 11/052,896

(22) Filed: Feb. 9, 2005

(65) Prior Publication Data

US 2005/0173889 A1    Aug. 11, 2005

(30) Foreign Application Priority Data

Feb. 10, 2004  (JP)  ............... 2004-034314

(51) Int. Cl.
*B62M 1/02* (2006.01)
(52) U.S. Cl. ...................... 280/260; 280/261
(58) Field of Classification Search ............ 280/281.1, 280/288.3, 260, 261
See application file for complete search history.

(56) References Cited

U.S. PATENT DOCUMENTS

| | | | | |
|---|---|---|---|---|
| 4,768,798 A | * | 9/1988 | Reed et al. | 280/281.1 |
| 5,522,612 A | * | 6/1996 | Considine | 280/260 |
| 5,975,266 A | * | 11/1999 | Balhorn | 192/64 |
| 6,786,497 B1 | * | 9/2004 | Olszewski | 280/260 |
| 6,877,393 B2 | * | 4/2005 | Takachi | 74/502.2 |
| 6,948,730 B2 | * | 9/2005 | Morita et al. | 280/260 |
| 2001/0023789 A1 | * | 9/2001 | Uneta et al. | 180/218 |

FOREIGN PATENT DOCUMENTS

| | | | |
|---|---|---|---|
| FR | 2753431 A | | 3/1998 |
| GB | 452359 A | * | 8/1936 |
| JP | 8-219139 A | | 8/1996 |
| WO | WO-03/064243 A | | 8/2003 |

OTHER PUBLICATIONS

U.S. Appl. No. 11/053,429, filed Feb. 9, 2005.
U.S. Appl. No. 11/053,926, filed Feb. 10, 2005.
U.S. Appl. No. 11/052,915, filed Feb. 9, 2005.
U.S. Appl. No. 11/052,866, filed Feb. 9, 2005.
U.S. Appl. No. 11/053,903, fied Feb. 10, 2005.
U.S. Appl. No. 11/052,863, filed Feb. 9, 2005.

* cited by examiner

*Primary Examiner*—Lesley D. Morris
*Assistant Examiner*—Maurice Williams
(74) *Attorney, Agent, or Firm*—Birch, Stewart, Kolasch & Birch, LLP

(57) ABSTRACT

To improve the operability by a speed-change cable and to reduce the cable by selecting an adequate arrangement structure of the speed-change cable from a transmission case to an operating element of a handle on the front portion of a vehicle body. An arrangement structure of a speed-change cable is such that the speed-change cable is attached at one end to an arm portion of a derailleur and the speed-change cable is guided from the mounting portion through an outer cable mounting hole of a derailleur shaft to a through-hole opening at the upper front portion of a transmission case, and extends from the through-hole outside the case and along the front frame of the vehicle body substantially straight. The extended end is attached to a cable operation mechanism at the handle on the front portion of the vehicle body.

21 Claims, 20 Drawing Sheets

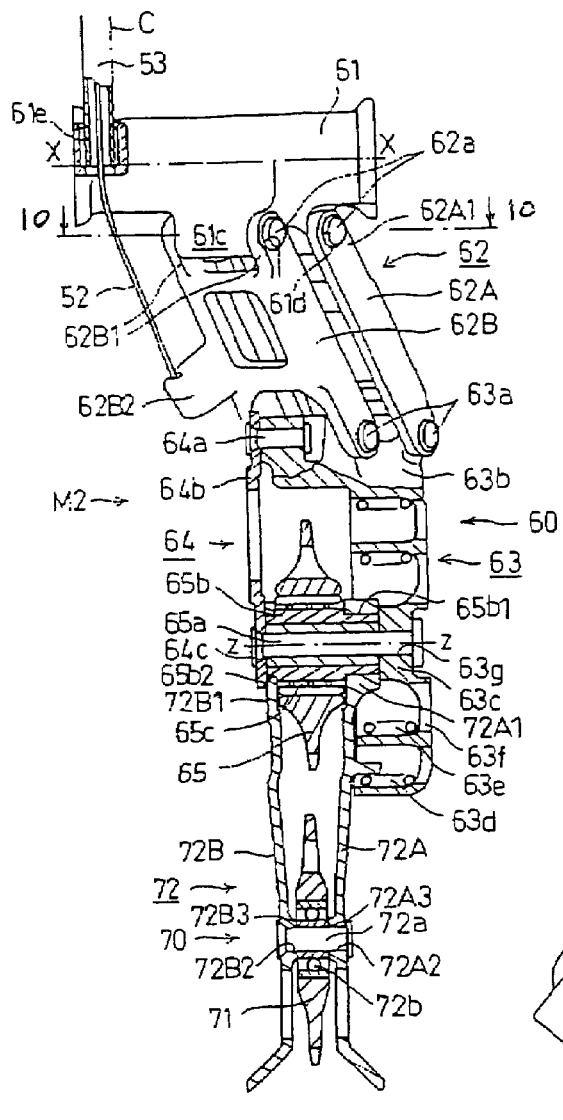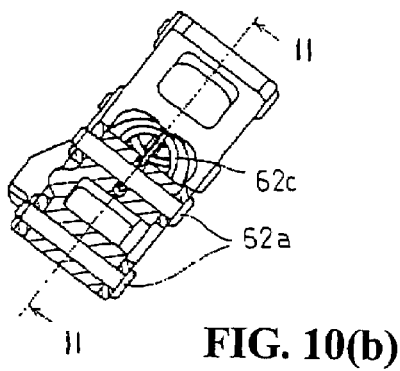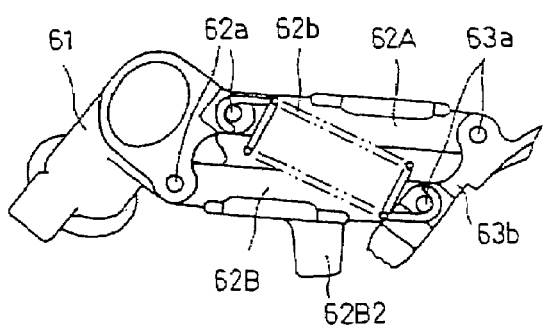
FIG. 10(a)
FIG. 10(b)
FIG. 10(c)

A-view

ARRANGEMENT STRUCTURE OF SPEED-CHANGE CABLE

CROSS-REFERENCE TO RELATED APPLICATIONS

The present application claims priority under 35 USC 119 to Japanese Patent Application No. 2004-034314 filed on Feb. 10, 2004 the entire contents of which are hereby incorporated by reference.

BACKGROUND OF THE INVENTION

1. Field of the Invention

The present invention relates to an arrangement structure of a speed-change cable. More specifically, to an arrangement structure of a speed-change cable in a transmission for a bicycle.

2. Description of Background Art

A connecting portion of the speed-change cable connected to a derailleur in the transmission for a bicycle in the related art is located at the rear portion of the bicycle because the position to arrange the derailleur is in the vicinity of an axle of a rear wheel. Thus, the speed-change cable to be connected to the derailleur is arranged so as to extend from the connecting portion towards the rear of the vehicle body, inverted to form a curved portion, and extend to a speed-change operation member on a handle at the front of the vehicle body. See, for example, JP-A-8-219139 pages 3-4 and FIG. 4-FIG. 5.

As shown in FIGS. 20(a) and 20(b), the derailleur operating cable in the transmission for a bicycle disclosed in JP-A-8-219139 is configured in such a manner that a connecting portion at one end of an operating wire 02, which is an inner cable of the cable 01 is connected to the derailleur, not shown in FIGS. 20(a) and 20(b). Thus, the operating wire 02, which is the inner cable of the cable 01, is pulled or slackened to operate the derailleur by speed-change operation of a speed-change operating element provided on the handle, not shown, to select a desired speed gear.

Among others, the rear derailleur operating cable 01 is arranged so as to have an extending portion 03 from the connecting portion to the rear derailleur, not shown, rearwardly of the vehicle body, inverted to form a curved portion 04, extending along a lower horizontal frame 05 or a obliquely upwardly extending frame 06 of the vehicle body. The cable 01 further extends along the oblique frame 07 or a horizontal frame 08 and extends towards the speed-change operating element, not shown, provided on the handle at the front of the vehicle body, and connected to the speed-change operating element at the extended end, which is the other end of the cable 01, via the wire 02, which is the inner cable.

The above-described derailleur operating cable 01 which extends at portion 03 from the connecting portion to the rear derailleur rearwardly of the vehicle body and then is inverted and extends towards the front of the vehicle body cannot avoid the existence of the curved portion 04 in the course of the extension thereof. The existence of the curved portion 04 causes a frictional force between the operating wire 02, which is the inner cable of the cable 01, and the outer cable at the curved portion. Consequently, an operating load in operating the derailleur increases, and the smooth operability thereof is impaired. Thus, increases in the length of the operating cable 01 due to the existence of the curved portion 04 cannot be avoided.

Because of the arrangement structure of the above-described operating cable, the existence of the curved portion cannot be avoided in the extension forwardly of the vehicle body. Thus, a reduction of the operating load for the speed-change is difficult due to its structure, and the securement of good operability is limited. There is also a problem that a reduction in the length of the operating cable cannot be achieved.

SUMMARY AND OBJECTS OF THE INVENTION

It is an object of the present invention to solve the problem described above.

The present invention is an arrangement structure of a speed-change cable for solving the above-described problem. More specifically, the invention relates to an improved structure aiming at an arrangement of the cable for achieving improvement of the operability of the speed-change cable, a reduction in the operating load during speed-change operation, and a reduction of the length of the speed-change cable by exercising specific ingenuity with respect to the extending structure of the speed-change cable from a transmission case. The structure includes a mainframe of a vehicle body extending obliquely rearwardly and downwardly from a head pipe which rotatably supports a handle. The transmission case is supported by the mainframe and accommodates a transmission in the internal space thereof. The transmission case includes a through-hole at a portion facing forward or upward of the vehicle body, and the speed-change cable for causing the transmission to change the speed that is passed through the through-hole. The invention is also directed to a mainframe of the vehicle body which includes a mainframe and a down tube extending from the head pipe rearwardly and downwardly substantially in parallel. The transmission case is disposed so as to overlap with at least part of the mainframe and the down tube in a side view with a through-hole being provided at substantially the same distance from the mainframe and the down tube. The present invention includes a transmission that is provided with a gear shift mechanism (M2) for changing the speed by the operation of the speed-change cable. The gear shift mechanism is disposed in front or above the transmission case.

In the present invention, a structure is provided including a primary frame of a vehicle body extending obliquely rearwardly and downwardly from a head pipe which rotatably supports a handle. A transmission case is supported by the primary frame and accommodates the transmission in the internal space thereof. The transmission case includes a through-hole at a portion facing forwardly or upwardly of the vehicle body with a speed-change cable for causing the transmission to change the speed that passes through the through-hole. Therefore, since the speed-change cable is directed toward the head pipe, slack of the speed-change cable is reduced, whereby the operating load during a speed-change operation is reduced. Since there is little slack on the cable, the length of the cable can be reduced, whereby the cost and the weight can be reduced. In addition, since there is a large space around the through-hole, maintenance in the periphery of the through-hole can be easily performed.

In the present invention, the primary frame of the vehicle body includes a mainframe and a down tube extending from the head pipe rearwardly and downwardly substantially in parallel. The transmission case is disposed so as to overlap with at least part of the mainframe and the down tube in a side view with the through-hole being provided at substantially the same distance from the mainframe and the down tube. Therefore, the speed-change cable extends along the front portion of the vehicle body in a state of being substantially straight without a forcedly formed curved portion toward a speed-change operation member installed on the handle. Thus, generation of friction between a wire, which is an inner cable, and an outer tube, which is an outer cable is reduced to the minimum, and the reduction of speed-change load during speed-change operation is achieved, whereby the operability is improved. Also, reduction of the speed-change cable is achieved.

In the present invention, the transmission is provided with a gear shift mechanism (M2) for changing the speed by the operation of the speed-change cable, and the gear shift mechanism is disposed in front or above the transmission case. Therefore, since the length of the speed-change cable (wire) in the transmission case can be reduced within the transmission case by arranging the gear shift mechanism in front of or above the transmission case, the speed-change load can further be reduced. Thus, the cost and weight can further be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 10(a) to 10(c) are illustrations of the entire structure of the derailleur, in which 10(a) is the entire structure of the derailleur partly in cross-section, 10(b) is a cross-sectional view taken along the line 10-10 in 10(a), and 10(c) is a cross-sectional view taken along the line 11-11 in 10(b);

DETAILED DESCRIPTION OF THE PREFERRED EMBODIMENTS

Referring now to FIG. 1 to FIG. 19, an embodiment of the structure of a transmission for a bicycle provided with a derailleur having a speed-change cable according to the present invention will be described.

Figure 1:
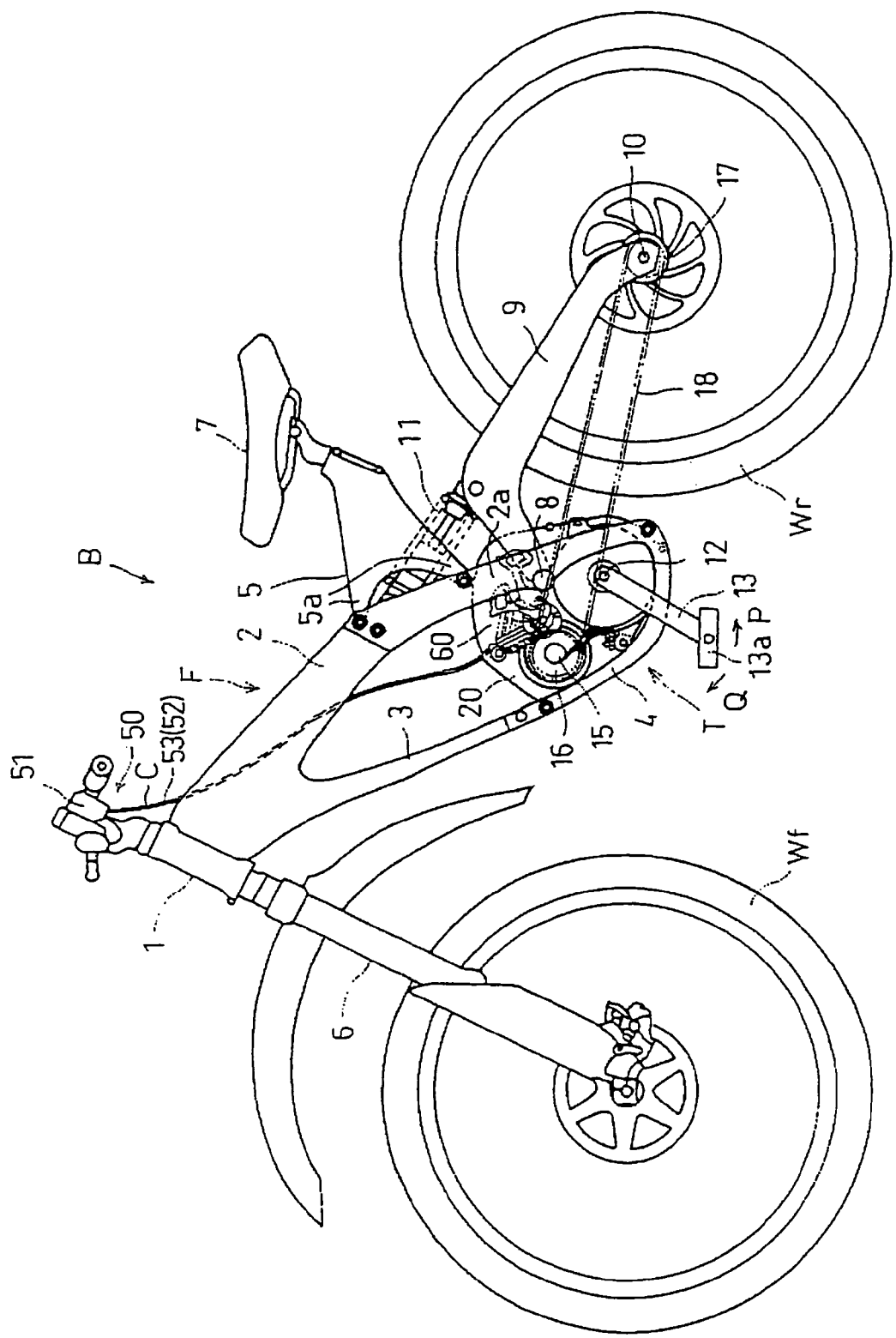
FIG. 1 is a schematic left-side view of a bicycle according to an embodiment of the present invention.

FIG. 1 shows a left side view of a bicycle B using a transmission T provided with a derailleur according to the present invention.

The bicycle B is a downhill bicycle and is used for a competitive sport for competing against time for operating down a dirt course such as a forest road provided with a high-speed corner or a jumping section.

Figure 2:
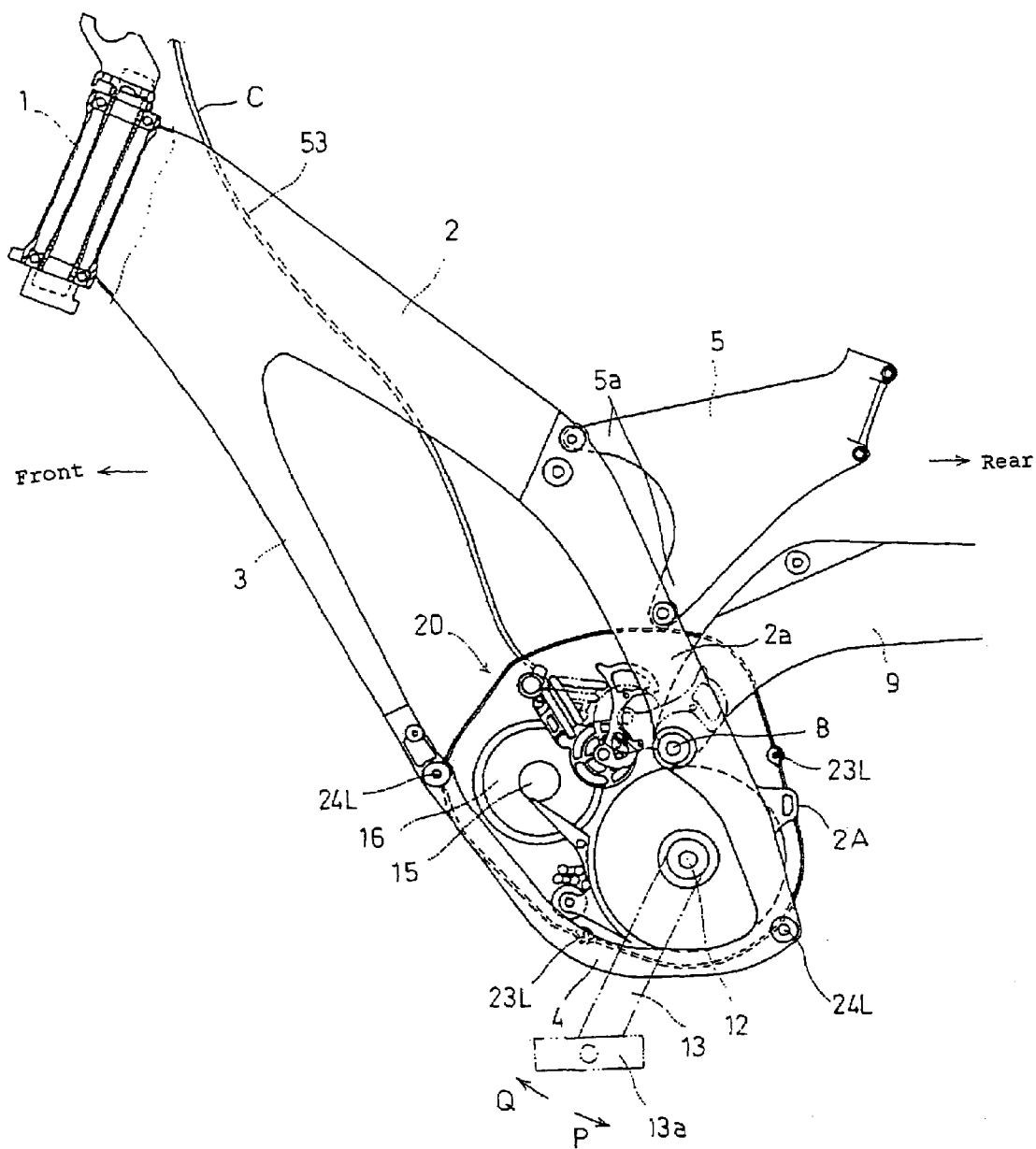
FIG. 2 is a drawing showing a principal portion of a frame and a state of suspending a case.

A vehicle body frame F of the bicycle B includes, as shown in FIGS. 1 and 2, a pair of left and right mainframes 2 extending from a head pipe 1 rearwardly and obliquely downward, and a down tube 3 extending from the front ends of both mainframes 2 rearwardly and obliquely downwardly at the lower portion thereof, and the lower ends of a pair of the mainframes 2 and the lower end of the down tube 3 are connected to each other via an under tube 4.

A saddle frame 5 is provided so as to extend rearwardly from the centers of the respective mainframes 2 in pair.

The saddle frame 5 for supporting a saddle 7 is supported by the mainframes 2 by fixing a front end arm portion 5a to the centers of the mainframes 2 via a bolt B.

The head pipe 1 steerably supports a pair of left and right front forks 6, and a front wheel Wf is journaled at the lower ends of the front forks 6 via a shaft.

Hereinafter, terms "up and down", "front and rear", "left and right" represents directions with reference to the bicycle B, and correspond to the "up and down", "front and rear", and "left and right" of the bicycle. The side view means to view from the left or right.

As shown in FIGS. 1 and 2, front ends of a pair of left and right swing arms 9 are pivotably supported by a pivot shaft 8 provided at the rear of the left and right mainframes 2 shown in FIG. 1 so as to be adjacent to the respective inner surfaces of a pair of the left and right mainframes 2. A rear wheel Wr is journaled between a pair of the left and right swing arms 9 at the rear ends thereof via an axle 10. A pair of the left and right swing arms 9 are connected to the above-described pair of the left and right mainframes 2 via a suspension 11 having a compression spring and a damper. Thus, the arms 9 are capable of swinging motion in the vertical direction about the pivot shaft 8.

A crankshaft 12 and a power transmission device including a transmission T and a drive force transmission mechanism for the rear wheel Wr are mounted to the bicycle B. As shown in FIGS. 1 and 2, the crankshaft 12 and the transmission T are disposed below the vehicle body frame F, and between the vehicle body frame F and the under tube 4 connecting the rear portions of the both mainframes 2, and the rear portion of the down tube 3, more specifically, the lower portion of the mainframe 2 and the lower end of the down tube 3. A drive force transmission mechanism is provided including a mechanism for transmitting a drive force from the transmission T to the rear wheel Wr, more specifically, a rear wheel drive sprocket 16, a rear wheel driven sprocket 17, and an endless rear wheel drive chain 18 wound around the both sprockets 16, 17 which is disposed on the right side of the bicycle B, on the right side with respect to the center line along the center of the width of the vehicle body.

Figure 3:
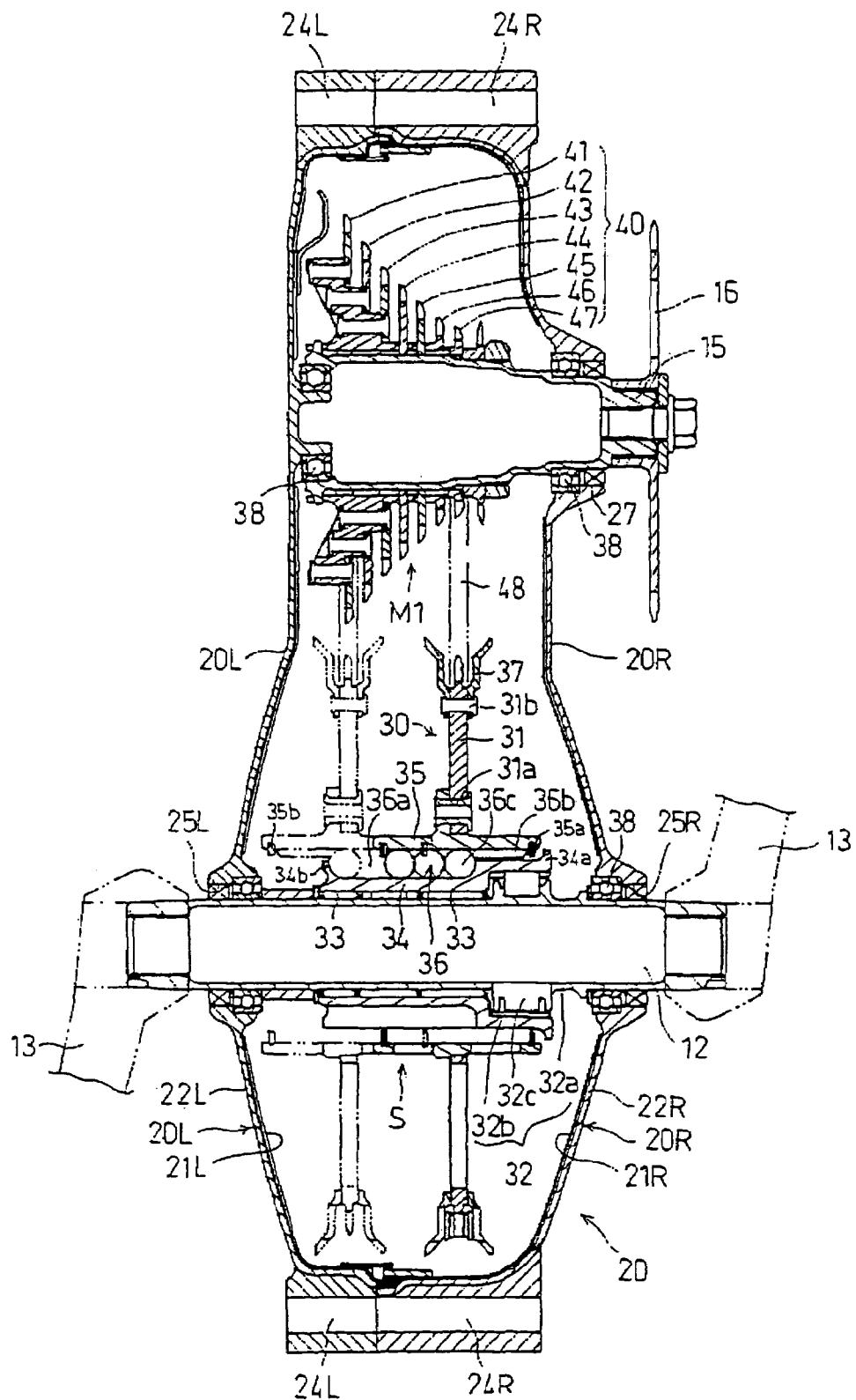
FIG. 3 is a cross-sectional view taken along the line 3-3 in FIG. 6.
Figure 4:
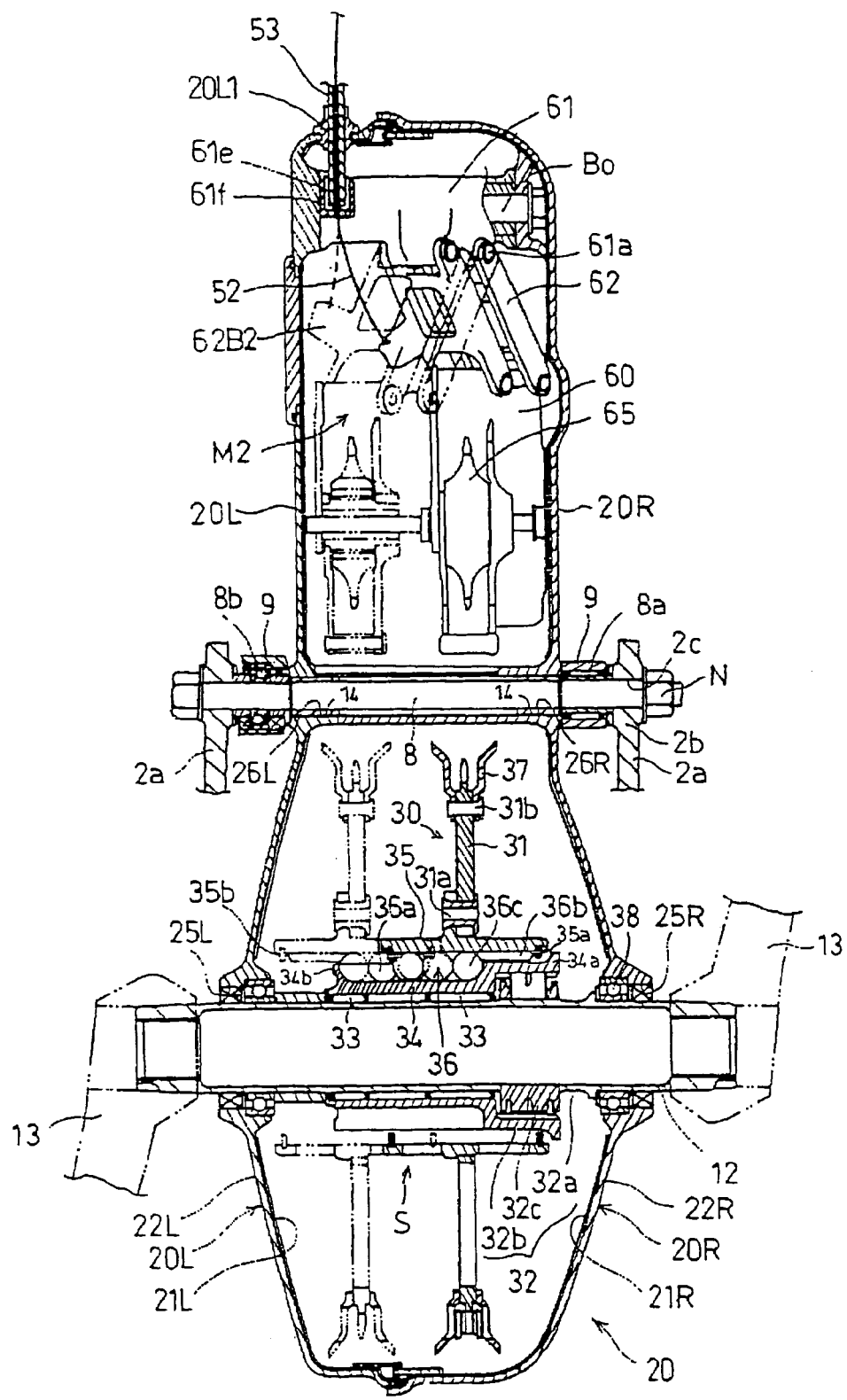
FIG. 4 is a cross-sectional view taken along the line 4-4 is FIG. 6.
Figure 5:
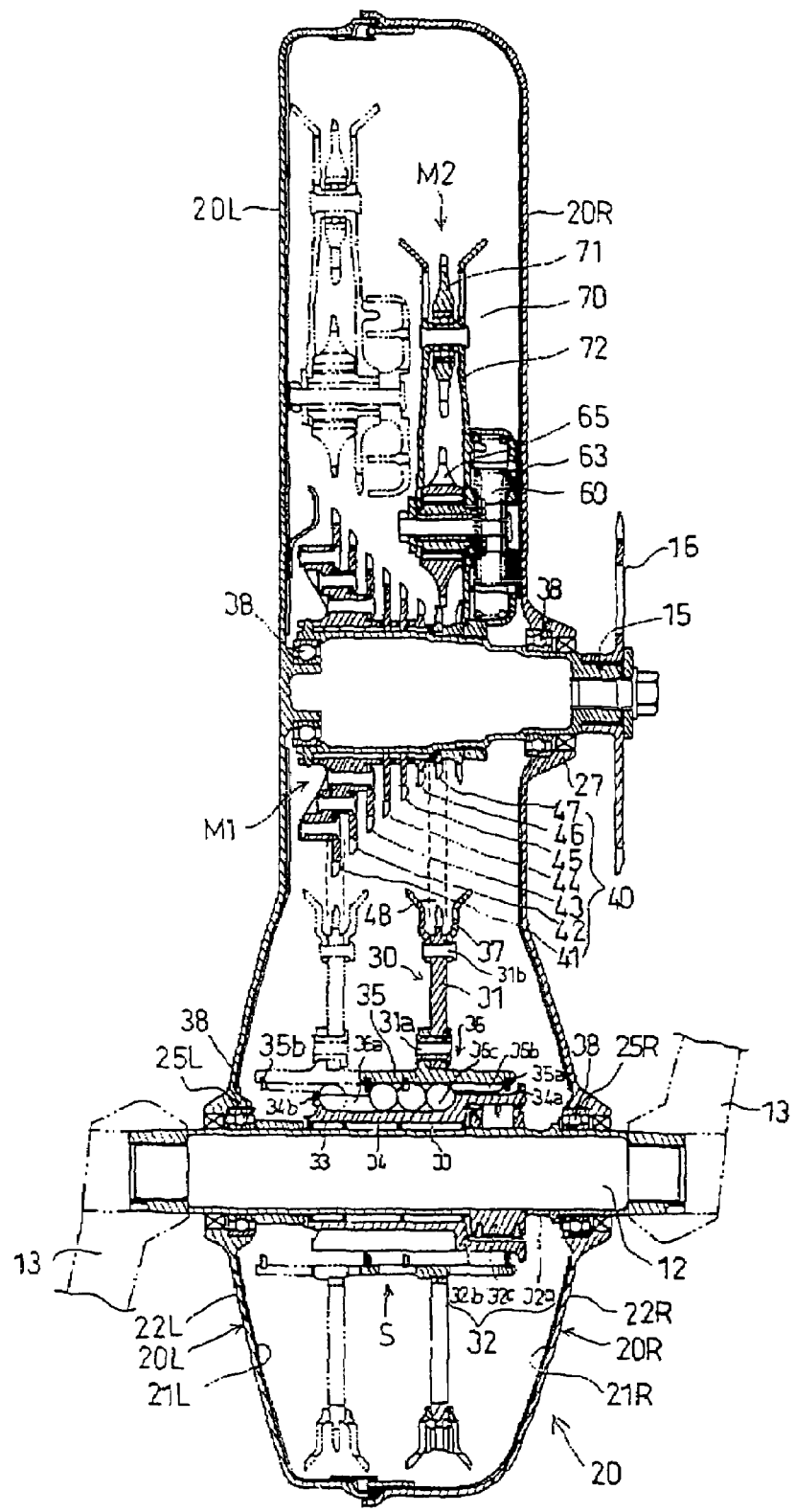
FIG. 5 is a cross-sectional view taken along the line 5-5 in FIG. 6.

As shown in FIGS. 3 to 5, a case 20 of the above-described transmission T includes a left case 20L and a right case 20R and is configured by combining these left and right halves. The left and right cases 20L, 20R each include a left cover 21L and a right cover 21R formed of CFRP (Carbon Fiber Reinforced Plastic) for covering an internal device. A left reinforcing member 22L and a right reinforcing member 22R are formed of aluminum alloy for reinforcing the left and right covers 21L, 21R from the outside. The left cover 21L is adhered to the inside of the left reinforcing member 22L and the right cover 21R is adhered to the inside of the right reinforcing member 22R, respectively.

The left and right covers 21L, 21R abut against each other at the mating portions thereof via a sealing member, and are integrated by being tightened by bolts, not shown clearly, inserted into bolt holes 23L, 23R, 24L, 24R (only 24L and 24R are shown in FIG. 3) at the peripheral projecting portions of the left and right reinforcing members 22L, 22R on both sides of the mating portions.

Figure 6:
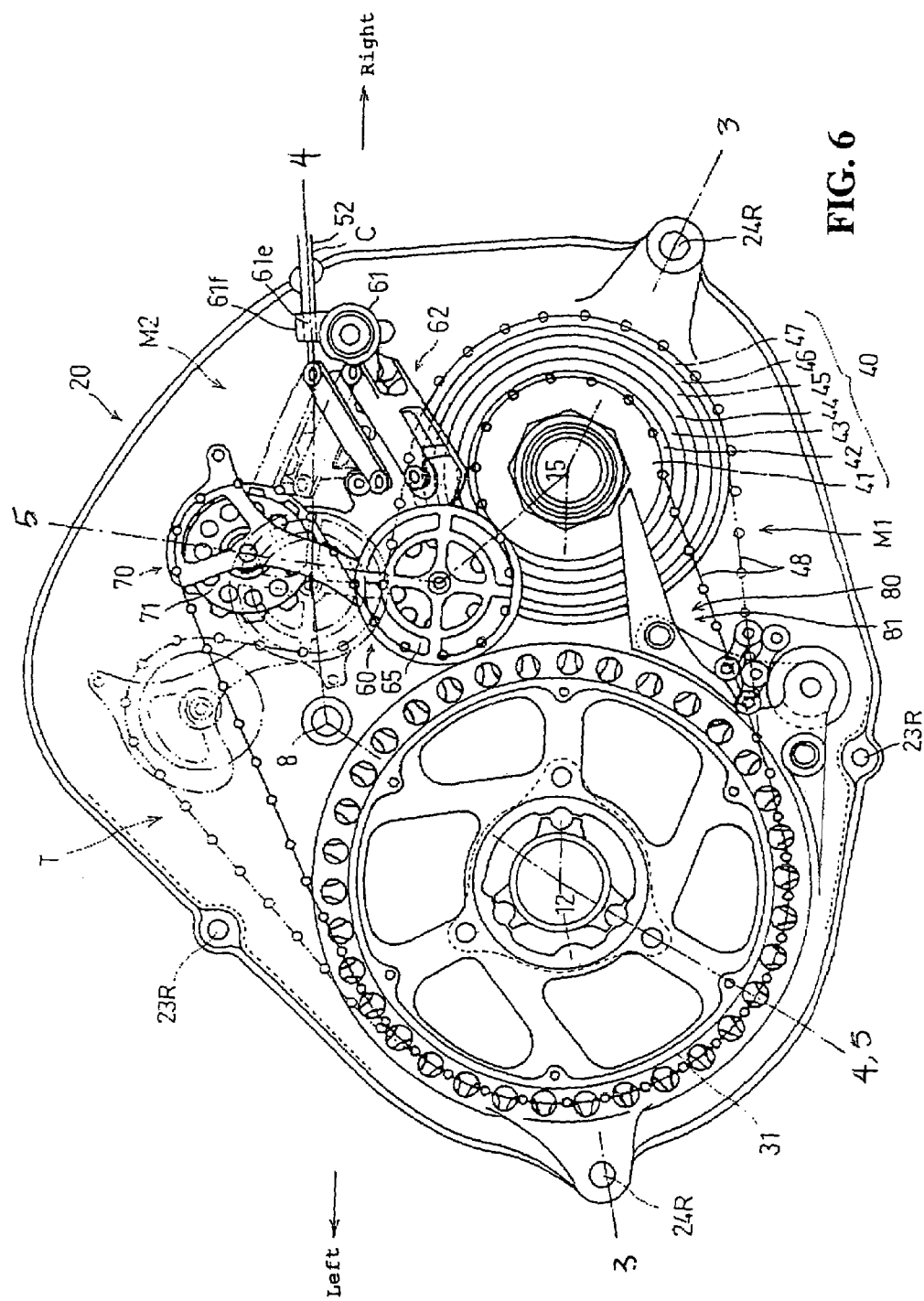
FIG. 6 is a right-side view of the interior of a transmission T with part of a right cover removed.

The two bolt holes 23L, 23L and 23R, 23R (only 23R on the side of the right case is shown in FIG. 6), provided on the left and right cases 20L, 20R are bolt holes for combining and tightening the left and right reinforcing members 22L, 22R.

The two bolt holes 24L, 24L and 24R, 24R (only 24R on the side of the right case is shown in FIG. 6), provided on the left and right cases 20L, 20R, are bolt holes for combining and tightening the left and right reinforcing members 22L, 22R to each other and mounting the cases 20L, 20R to the frame F. The front bolt holes 24L, 24R are provided for being tightened together with the under tube 4 connected to the lower end of the down tube 3 by the bolt B, and the rear bolt holes 24L, 24R are provided for being tightened together with the rear lower ends of the mainframes 2 by the bolt B.

On the lower portion of the left and right reinforcing members 22L, 22R of the case 20, as shown in FIGS. 3 to 5, crankshaft bearing holes 25L, 25R are formed respectively, and the crankshaft 12 passes through the crankshaft bearing holes 25L, 25R in the lateral direction. At the position upwardly of the crankshaft bearing holes 25L, 25R, pivot shaft bearing holes 26L, 26R are formed through which the pivot shaft 8 passes. See FIG. 4.

The left and right reinforcing members 22L, 22R as described above are joined with the left and right covers 21L, 21R and tightened by bolts to constitute the case 20 of the transmission T, and is suspended from the vehicle body frame F.

As shown in FIGS. 3 to 5, the crankshaft 12, which is a pedal-type crankshaft, is passed through the left and right crankshaft bearing holes 25L, 25R of the case 20 with the proximal ends of a pair of crank arms 13 being fitted to the left and right ends of the crankshaft 12 projecting out from the case 20 respectively. Pedals 13a are rotatably provided at the ends of the crank arms 13 as shown in FIGS. 1 and 2.

As shown in FIGS. 1, 2 and 4, the bolt-shaped pivot shaft 8 extends through through-holes 2c of pivot bosses 2b formed at a rear portions 2a of the mainframes 2 and bushes 14 fitted to the pivot shaft bearing holes 26L, 26R of the left and right reinforcing members 22L, 22R of the case 20, and is fixed to the rear portions 2a of the mainframes 2 by nuts N screwed onto the distal ends of the bolt-shaped pivot shaft 8, so that respective swing arms 9 are swingably supported by the pivot shaft 8 between the case 20 and the rear portions of the respective mainframes 2 and at the left and right outsides of the case 20 via collars 8a and bearings 8b. See FIG. 4.

FIG. 6 is a right side view of the interior of the transmission T with part of the right case 20R removed, showing the portion relating to the crankshaft 12 and the output shaft 15.

As is understood also from FIGS. 3 and 5, the rear wheel drive sprocket 16 is fitted to the right end of the output shaft 15 stored in the case 20 and projects outward from an output shaft bearing hole 27 of the right case 20R.

As shown in FIG. 1, the rear wheel drive chain 18 is wound between the rear wheel drive sprocket 16 and the rear wheel driven sprocket 17 provided on the rear wheel Wr.

The rear wheel drive sprocket 16, the rear wheel driven sprocket 17, and the rear wheel drive chain 18 constitute the drive force transmission mechanism for driving the rear wheel Wr, which is the drive wheel of the bicycle.

The output shaft 15 is constantly coupled to the rear wheel Wr, and rotates in conjunction therewith in the forward direction P and the rearward direction Q. See FIG. 1.

As is seen in FIGS. 5, 6 and so on, the transmission T includes a speed-change mechanism M1 and the gear shift mechanism M2 accommodated in the case 20.

The speed-change mechanism M1 is, as shown in FIGS. 3, 5, 6 and so on composed mainly of parts relating to the crankshaft 12 and the output shaft 15. The gear shift mechanism M2 is composed mainly of parts relating to the derailleur shaft shown in FIGS. 10 to 12.

The gear shift mechanism M2 acts on the speed-change mechanism M1, and shifts the speed-change mechanism M1 toward the desired shift position.

The speed-change mechanism M1 is provided with a one-way clutch 32 shown in FIGS. 3, 5, 6 and so on, and a sliding mechanism S, a drive sprocket unit 30, a speed-change sprocket unit 40, an endless speed-change chain 48, and the output shaft 15 as shown in FIGS. 3, 5 and 6.

The speed-change sprocket unit 40 includes a plurality of sprockets 41, 47 overlapped into a multi-stage in ascending order in size from the left to the right with spaces in-between and joined by spline fitting.

As shown in FIGS. 3, 5 and so on the crankshaft 12 is rotatably supported by the case 20 via a pair of left and right bearings 38 fitted to the crankshaft holes 25L, 25R of the left and right reinforcing members 22L, 22R of the case 20. The crank arms 13 are integrally fitted to both ends of the crankshaft 12. As shown in FIG. 1, the pedals 13a are rotatably fitted to the distal ends of the crank arms 13, so that the crankshaft 12 is rotated in the forward direction P by the feet of a person who rides on the bicycle B, not shown, as he/she straddles over and sitting on the saddle 7.

In FIGS. 3, 5 and so on, the crankshaft 12 is provided with the drive sprocket unit 30 between both bearings 38. A drive sprocket 31 of the drive sprocket unit 30 is fitted to the crankshaft 12 via the one-way clutch 32 and the sliding mechanism S disposed coaxially with the crankshaft 12 and is rotated by the crankshaft 12.

Figure 7:
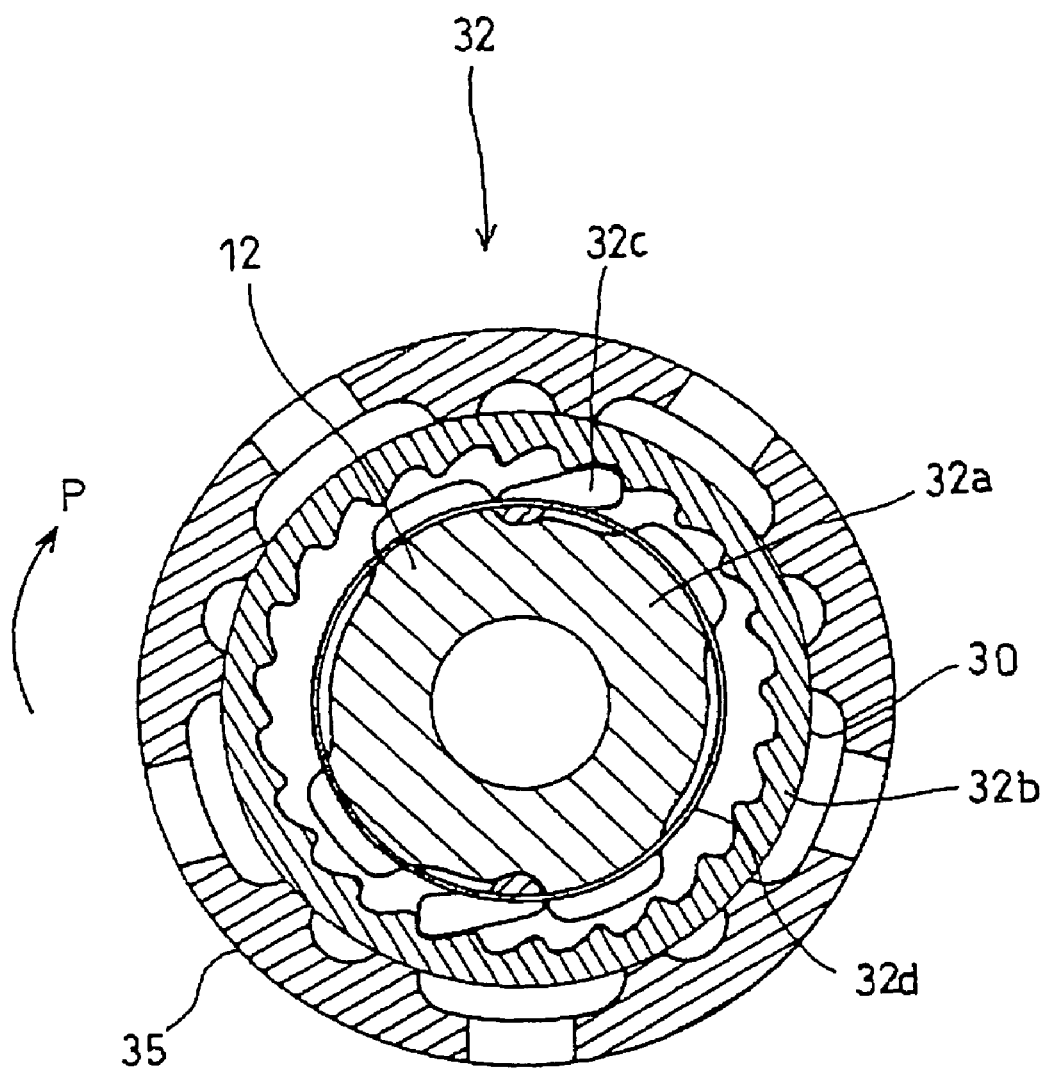
FIG. 7 is a cross-sectional view of a principal structure of a mounting portion of a crankshaft.

As shown in FIG. 7, the one-way clutch 32 includes a clutch inner 32a that includes the outer periphery itself of part of the crankshaft 12, a clutch outer 32b including a part of an inner cylinder 34 (see FIG. 3 and so on) described later, a plurality of ratchet claws 32c that engage engaging portions on the inner periphery of the clutch outer 32b, and a ring spring 32d fitted to the clutch inner 32a for urging the distal end of the ratchet claw 32c to engage the recess on the inner peripheral surface of the clutch outer 32b.

By the action of the one-way clutch 32, the rotational force of the crankshaft 12 is transmitted to the drive sprocket 31 only when the person who rides on the bicycle B pushes the pedals 13a, and rotates the crankshaft 12 in the forward direction P, in which the bicycle B advances. When the person who rides on the bicycle B stops pushing the pedals 13a while the bicycle B is moving forward, and the drive sprocket 31 rotates in the forward direction P, that is, when the crankshaft 12 is rotated in the rearward direction Q with respect to the drive sprocket 31, transmission of the rotational force occurs from the drive sprocket 31 to the crankshaft 12.

In FIGS. 3 to 5 and so on, provided between the one-way clutch 32 and the drive sprocket 31 is the sliding mechanism S for allowing the drive sprocket 31 to move with respect to the crankshaft 12 in the direction of the axis of the crankshaft and for rotating integrally with the clutch outer 32b of the one-way clutch 32.

The sliding mechanism S shown in FIGS. 3 to 5 and so on, includes the inner cylinder 34, an outer cylinder 35, and a ball spline mechanism 36.

The inner cylinder 34 includes, at the right end thereof, the outer 32b of the one-way clutch 32. The inner cylinder 34 is a cylinder rotatably supported on the outer periphery of the crankshaft 12 via a pair of needle bearings 33. The outer cylinder 35 is a cylinder disposed radially outwardly of the inner cylinder 34.

The ball spline mechanism 36 is a spline engaging mechanism using a ball 36c provided between the outer peripheral surface of the inner cylinder 34 and the inner peripheral surface of the outer cylinder 35 with a drive sprocket 31 being integrally joined to an annular flange of the outer cylinder 35 of the corresponding mechanism by a rivet 31a. The outer cylinder 35 and the drive sprocket 31 are adapted to be capable of moving integrally along the direction of the axis of the crankshaft 12, and to rotate with respect to the case 20.

A chain guide 37 is integrally mounted on the outer periphery of the drive sprocket 31 by a rivet 31b.

As shown in FIGS. 3 to 5 and so on, the ball spline mechanism 36 for allowing the sliding mechanism S and the drive sprocket 31 to rotate integrally with each other, and allowing the drive sprocket 31 and the outer cylinder 35 to move with respect to the inner cylinder 34 in the direction of the axis of the crankshaft includes a plurality of pairs of accommodating grooves 36a, 36b that are semi-circular in cross section and radially opposing to each other on the outer peripheral surface of the inner cylinder 34 and the inner peripheral surface of the outer cylinder 35 and being oriented in the direction of the crankshaft axis. A plurality of balls 36c are accommodated therein so as to rotate across the respective pair of accommodating grooves and circumferentially engage the inner cylinder 34 and the outer cylinder 35.

In order to define the movable range of the drive sprocket 31 and the outer cylinder 35, and to prevent the balls 36c from being dropped, stoppers 34a, 34b, 35a, 35b are provided at both ends of the inner cylinder 34 and the outer cylinder 35.

As shown in FIGS. 3 and 5, the output shaft 15 is rotatably supported, respectively, via a pair of the left and right bearings 38 held respectively by the left and right reinforcing members 22L, 22R of the case 20.

The multi-stage speed-change sprocket unit 40 for speed change includes a plurality of speed-change sprockets mounted to the output shaft 15 between the left and right bearings 38 of the output shaft 15 so as to rotate constantly integrally with the output shaft 15. In this embodiment, the multi-stage speed-change sprocket unit 40 is a sprocket unit including seven types of speed-change sprockets 41-47 for speed change having different outer diameters.

The seven speed-change sprockets 41-47 are disposed in line in the direction of the axis of the output shaft in descending order in speed from the right to the left from the speed-change sprocket 47 for the seventh speed (maximum speed) having the smallest outer diameter to the speed-change sprocket 41 for the first speed (minimum speed) having the largest outer diameter, and are spline-fitted to the outer peripheral surface of the output shaft 15 and connected to the output shaft 15.

A speed-change chain 48 is wound around the drive sprocket unit 30 and the speed-change sprocket unit 40, and rotation is transmitted between the crankshaft 12 and the output shaft 15 by the speed-change chain 48. The gear shift mechanism M2, described later, is a mechanism for changing the speed by shifting the speed-change chain 48 among a group of the speed-change sprockets 41-47. In other words, the gear shift mechanism M2 acts to wind the speed-change chain 48 between one of the speed-change sprocket selected from the speed-change sprockets 41-47 by the gear shift mechanism M2, and the drive sprocket 31.

Therefore, the output shaft 15 is rotated by the crankshaft 12 at a change gear ratio determined by the ratio of the number of teeth between the speed-change sprockets 41-47 and the drive sprocket 31.

The motive power of the output shaft 15 is transmitted to the rear wheel Wr via the rear wheel drive sprocket 16, the rear wheel drive chain 18, and the rear wheel driven sprocket 17 (see FIG. 1) provided on the outside of the case 20 on the right side.

When the bicycle B in the related art travels by inertia, since the speed-change chain 48 is not rotated, it is difficult to shift the chain 48. The speed-change operation by the speed-change mechanism M1 cannot be performed in a normal manner. This embodiment has a structural improvement with regard to this point. The description of the structure will be added below.

Figure 8B:
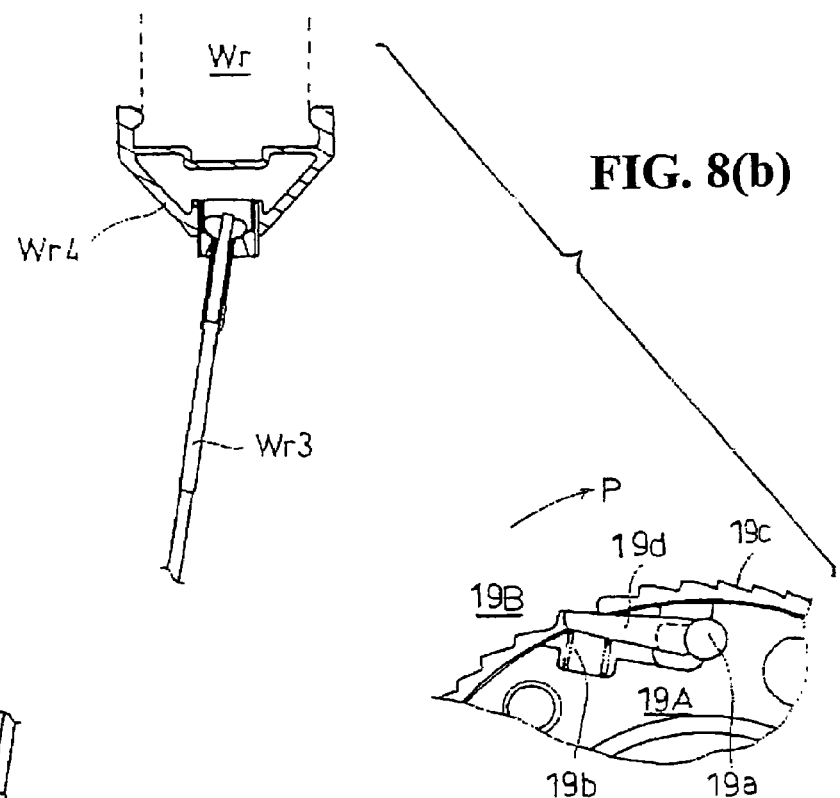
FIGS. 8(a) and 8(b) are illustrations showing a structure of a rear wheel mounting portion, in which 8(a) is a cross-sectional view of the principal structure of the rear wheel mounting portion, and 8(b) is a cross-sectional view taken along the line 8-8 in 8(a)
Figure 8A:
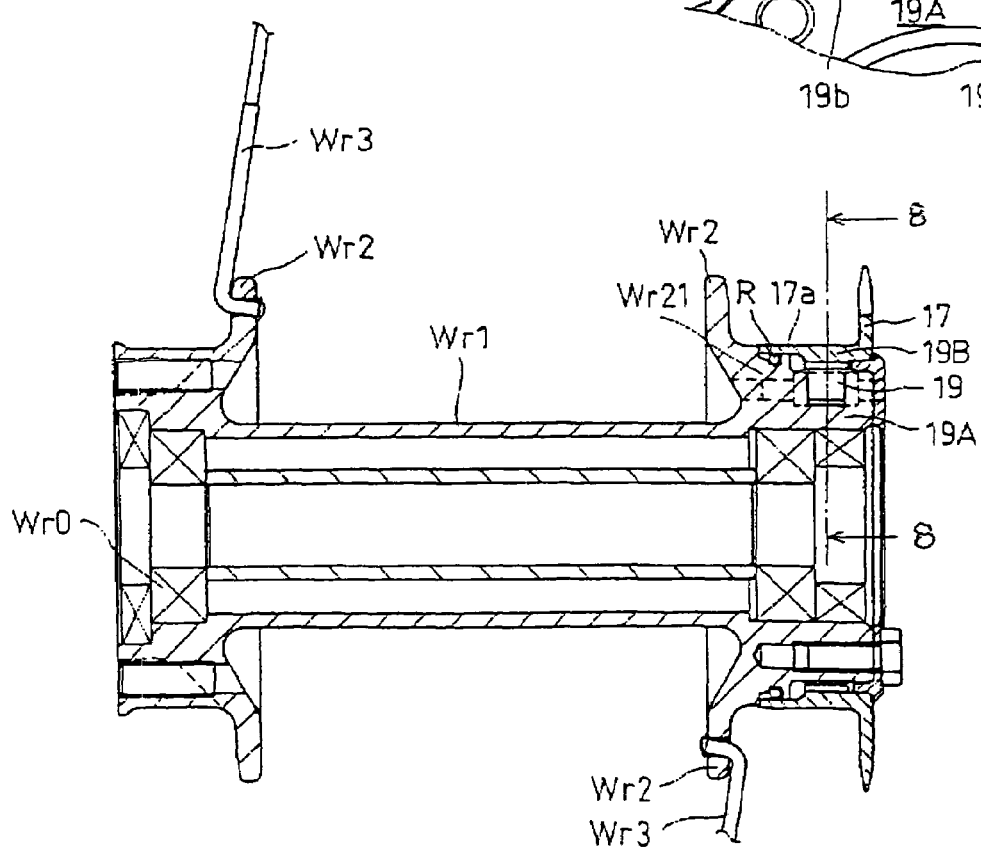

FIGS. 8(a) and 8(b) show a structure of the mounting portion of the rear wheel Wr. A rear wheel hub Wr1 is rotatably supported by the rear axle which is fixedly supported by the swing arm, not shown in FIGS. 8(a) and 8(b), via bearings Wr0. The hub Wr1 is provided with annular flanges Wr2 radially extending on the left and right sides thereof with a number of spokes Wr3 extending radially for supporting the rear wheel Wr being mounted to the annular flanges Wr2. The radial extremities of the spokes Wr3 are fixed to a wheel rim Wr4 of the rear wheel Wr, so that the rear wheel Wr is attached to the hub Wr1.

At the position on the right side of the right annular flange Wr2 of the hub Wr1 in FIG. 8(a), there is provided the driven sprocket 17, and the driven sprocket 17 is mounted to the hub Wr1 via the one-way clutch 19. The one-way clutch 19 has a structure as shown in FIG. 8(b).

More specifically, the one-way clutch 19 includes a clutch inner 19A including part of the outer periphery of the hub Wr1, a clutch outer 19B provided with a number of engaging portions 19c formed on the inner periphery of the driven sprocket 17, and a plurality of ratchet claws 19d having their rotational center 19a on the side of the clutch inner 19A and urged by a spring 19b so as to engage the engaging portions 19c on the inner periphery of the clutch outer 19B.

In the one-way clutch 19 in this structure, although the rotation P from the side of the clutch outer 19B, more specifically, the rotation from the side of the driven sprocket 17 is transmitted to the hub Wr1, and a drive force is transmitted from the side of the driven sprocket 17 to the side of the hub Wr1, more specifically, to the side of the rear wheel Wr, the rotation on the side of the clutch inner 19A, more specifically, the rotation from the side of the hub Wr1 is not transmitted to the side of the sprocket 17.

More specifically, it is configured in such a manner that the sprocket 17 is not driven by the drive chain 18 as in the case of inertia traveling with the rotation of the crankshaft 12 being stopped, or that the side of the hub Wr1, more specifically, the side of the rear wheel Wr rotates freely when the rear wheel Wr is rotated relatively faster than the sprocket 17 as in the case of running on a downward slope.

However, in this embodiment, a structure for limiting the above-described operation of the one-way clutch 19 is provided between the hub Wr1 and the driven sprocket 17, more specifically, an O-ring R that serves as a friction member, is interposed between the outer periphery Wr21 of the hub Wr1 on the right side of, and in the vicinity of, the annular flange Wr2 on the right side of the hub Wr1 and an inner periphery 17a of the left side of the driven sprocket 17 with both being fitted with friction via the O-ring R. Therefore, when the rotation transmitting torque between them is within a predetermined range, both are retained to rotate integrally by friction and hence the one-way clutch 19 is in a state in which its function is substantially lost.

Therefore, in the inertia traveling of the bicycle B as well, the rotation of the side of the hub Wr1, more specifically, on the side of the rear wheel Wr is transmitted to the driven sprocket 17 as is, the rear wheel drive chain 18 is rotated in association with the rotation of the driven sprocket 17, the rotation of the rear wheel drive chain 18 is transmitted to the speed-change mechanism M1, and the speed-change chain 48 is rotated. With this structure, even during the inertia traveling of the bicycle B, the speed-change chain 48 is shifted easily and hence the operation for changing the speed can be performed smoothly.

On the other hand, in order to prevent an excessive load to the speed-change mechanism M1 during operation of the bicycle B, the structure of this embodiment is adapted in such a manner that when the load exceeding a predetermined value is exerted to the rear wheel drive chain 18 from the side of the speed-change mechanism M1, both rotate with respect to each other against the fitting frictional force of the O-ring R between the hub Wr1 and the sprocket 17. Thus, only the rear wheel Wr rotates by the operation of the one-way clutch 19, whereby the rotation of the rear wheel Wr is not transmitted to the side of the driven sprocket 17 and the rear drive chain 18 and the speed-change chain 48 are not rotated, as a matter of course.

Subsequently, the structure relating mainly to a derailleur 60 of the gear shift mechanism M2, which has a characteristic structure, in this embodiment will be described.

Figure 9:
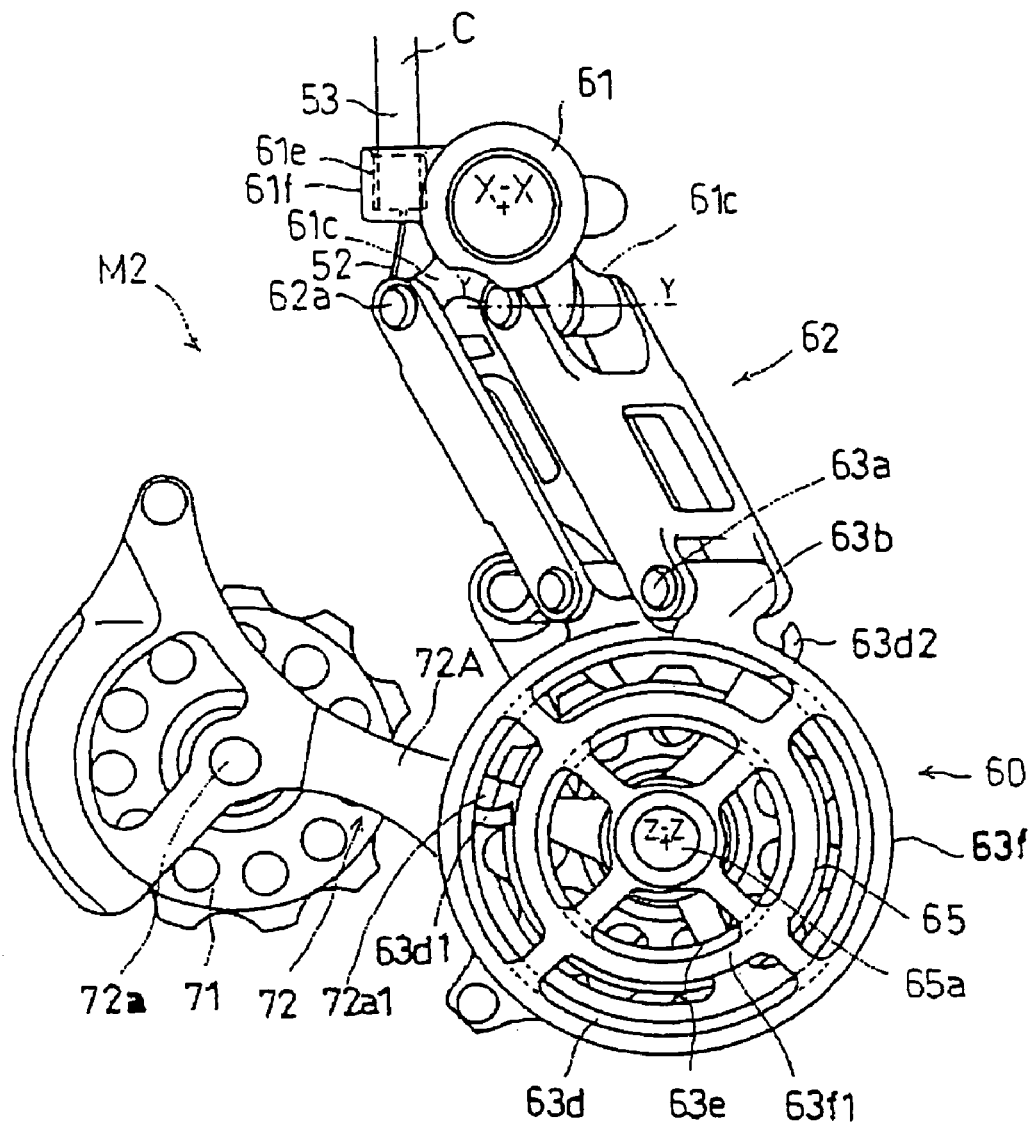
FIG. 9 is an outline perspective view showing an outline of the entire structure of a derailleur.

In FIG. 6 and FIG. 9, the gear shift mechanism M2 operated by a speed-change operation mechanism 50 (see FIG. 1) at the handle of the bicycle B includes the derailleur 60 and a tensioner 70 having a tensioner pulley 71.

As shown in FIG. 6, the speed-change chain 48 is wound around the drive sprocket 31 and the speed-change sprockets 41-47, and when traveling by manpower, around a guide pulley 65, which is disposed on the side where the speed-change chain 48 slacks, and the tensioner pulley 71.

The speed-change operation mechanism 50 shown in FIG. 1 includes a speed change operation member 51 formed of a speed-change lever or the like which is operated by the person riding on the bicycle B, and a speed-change cable C for connecting the speed-change operation member 51 and the derailleur 60 for transmitting the operation of the speed-change operation member 51 to the derailleur 60. The cable C includes an operating wire 52 and an outer cable 53 for covering the wire. See FIG. 1 and FIGS. 10(a) to 10(c). The operating wire 52 substantially connects the speed-change operation member 51 and the derailleur 60.

Figure 11:
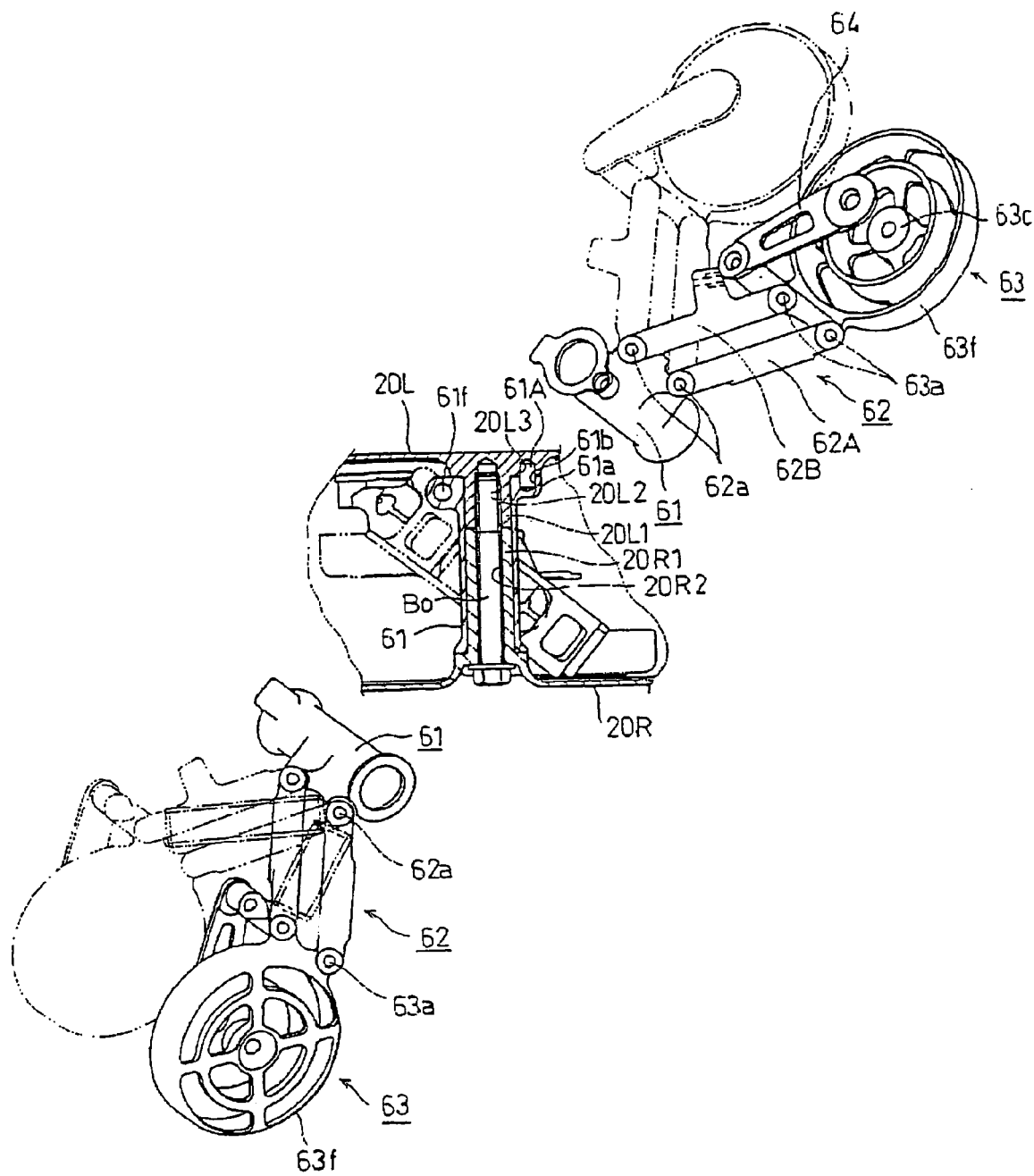
FIG. 11 is a drawing showing a structure of a mounting portion of a derailleur shaft and the mounting state of the derailleur.
Figure 12B:
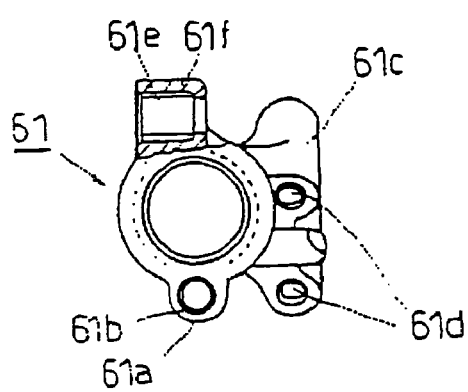
FIGS. 12(a) to 12(c) are illustrations showing a structure of the derailleur shaft in which 12(a) is a side view partly in cross-section, 12(b) is an end view partly in cross-section, and 12(c) is a drawing viewed in the direction indicated by an arrow A in 12(a).
Figure 12A:
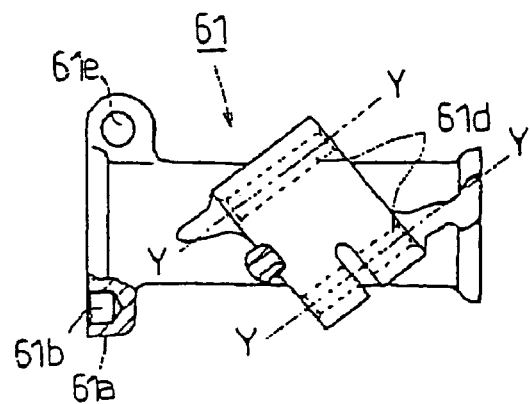
Figure 12C:
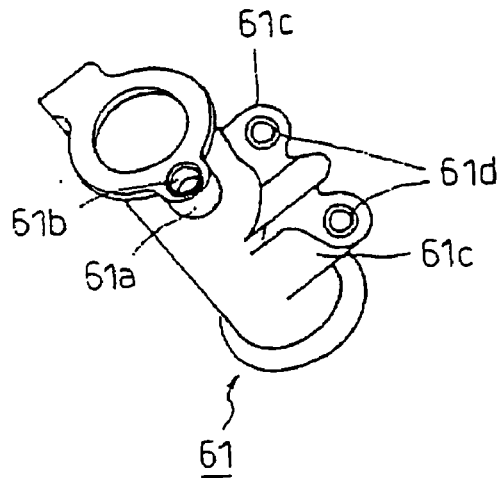
Figure 13A:
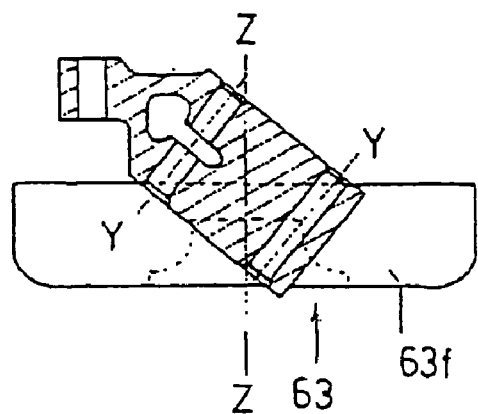
FIGS. 13(a) and 13(b) are illustrations showing a structure of a derailleur body in which 13(a) is a cross-sectional view taken along the line 13-13 in 13(b), with 13(b) being a front view.
Figure 13B:
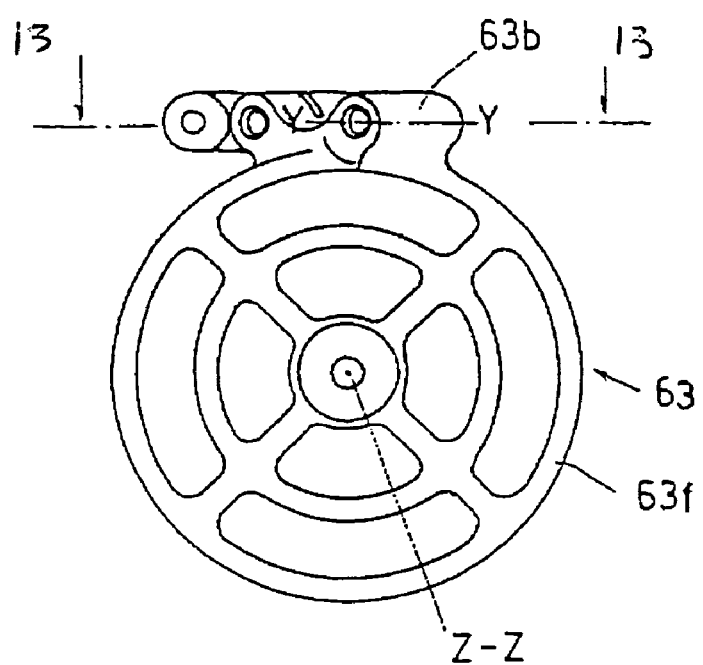
Figure 14B:
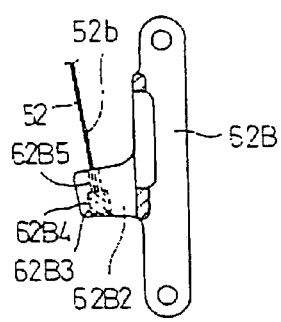
FIGS. 14(a) to 14(e) are illustrations showing a structure of a derailleur arm and a mounting structure of a speed-change cable to the arm, in which 14(a) is a plan view of the arm partly in cross-section, 14(b) is a cross-sectional view taken along the line 14-14 in 14(a), 14(c) is a view in the direction indicated by an arrow B in 14(e), 14(d) is an end view of the arm, and 14(e) is a cross-sectional view taken along the line 15-15 in 14(d)
Figure 14A:
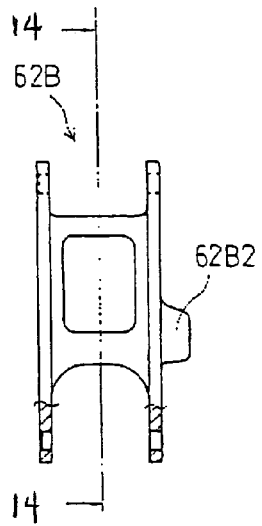
Figure 14C:
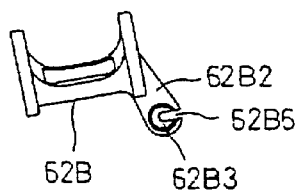
Figure 14D:
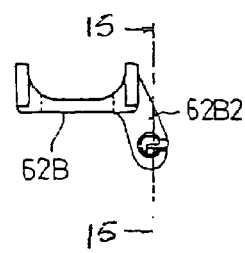
Figure 14E:
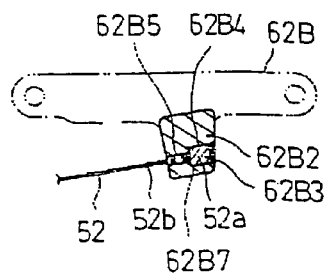

As illustrated in FIG. 11, the left and right cases 20L, 20R in a pair are provided with bosses 20L1, 20R1 projecting inwardly at the upper position thereof, and the bosses 20L1, 20R1 are different in projecting length since the widths of the both cases 20L, 20R are different as will be understood from the drawing. The boss 20R1 on the side of the wider right case 20R has a longer projecting length and is provided with a through-hole 20R2, while the boss 20L1 on the side of the narrower left case 20L has a shorter projecting length, and is provided with a blind hole 20L2. The blind hole 20L2 is formed with female threads.

When the left and right cases 20L, 20R are assembled and combined, both bosses 20L1, 20R1 oppose to each other on the identical line, and the projecting ends of both bosses 20L1, 20R1 abut against each other. A tightening bolt Bo inserted (fitted) into the through-hole 20R2 of the boss 20R1 on the side of the right case 20R is screwed into the female screw of the blind hole 20L2 of the boss 20L1 on the side of the left case 20L, whereby the left and right cases 20L, 20R are strongly tightened and integrated.

A derailleur shaft 61 in the shape of a hollow sleeve is fitted on the outer periphery of the bosses 20L1, 20R1 whereof the distal ends abut against each other, and the sleeve-shaped derailleur shaft 61 is provided with a hole 61b on a projecting portion 61a on the left end thereof. A stopper pin 61A is inserted between the hole 61b and a hole 20L3 which is formed on the proximal portion of the boss 20L1 of the left case 20L, whereby the derailleur shaft 61 is located at the right position with respect to the case 20L, and is fitted and supported with respect to the outer peripheries of both bosses 20L1, 20R1.

As shown in FIG. 9 to FIG. 12(c), the derailleur 60 is mounted to the outer periphery of the sleeve-shaped derailleur shaft 61. Thus, a projecting portion 61c of parallel construction having two parallel axes Y is provided on the outer periphery of the shaft 61. The projecting portion 61c is formed with holes 61d (see FIGS. 12(a) to 12(c)) to which supporting shafts 62a for mounting a derailleur arm unit 62 for mounting the derailleur 60 substantially to the derailleur shaft 61 are inserted. A pair of the holes 61d formed on the projecting portion 61c extend in parallel to each other with the holes 61d having axes Y which extend in the direction intersecting an axis X of the sleeve-shaped derailleur shaft 61 at a predetermined angle.

The derailleur 60 includes the arm unit 62 having a pair of derailleur arms 62A, 62B formed of plates shaped like the letter H as shown in FIGS. 9, 10(a) to 10(c), 11, 14(a) to 14(d) and so on, and the arm unit 62 is rotatably supported by a supporting shafts 63a in pair of a derailleur body 63 at the distal ends of the respective arms 62A, 62B, whereby two arms 62A, 62B are assembled into a parallel linkage, and the derailleur 60 is mounted to the sleeve-shaped derailleur shaft 61 via the arm unit 62.

Mounting of the derailleur arm unit 62 in a pair to the derailleur shaft 61 is achieved by locating a bifurcated proximal portions 62A1, 62B1 of the respective derailleur arms 62A, 62B (see FIG. 10(a)) so as to sandwich the projecting portion 61c in a pair to the derailleur shaft 61 from both sides, and inserting supporting shafts 62a into the holes 61d (see FIGS. 10(a) 10(b), 12(a) to 12(c) and so on) of the projecting portion 61c. By this mounting, the derailleur arm unit 62 of the parallel linkage is rotatably supported about the two supporting shafts 62a that intersect with the derailleur shafts 61 at a predetermined angle.

A compression spring 62b is provided between the supporting shaft 62a of the proximal portion 62A1 of one of the derailleur arms 62A of the derailleur arm unit 62 of parallel linkage and the supporting shaft 63a of the derailleur body 63 at the distal end of the other derailleur arm 62B. See FIG. 10(c).

When the operating wire 52, which is an inner cable of the speed-change cable C is in a slacked state, the compression spring 62b serves to pull a pair of the derailleur arms 62A, 62B toward each other. When the operating wire 52 is in a slacked state in which the speed-change operation is not done, the two derailleur arms 62A, 62B are maintained in a state shown in FIG. 10(c). This state is positioned as an initial state of the derailleur arms 62A, 62B, and when the derailleur arm unit 62 is in this state, a state in which the speed-change chain 48 of the speed-change mechanism M1 shown in FIGS. 3, 5 and so on is wound around the sprocket 47 the maximum speed is maintained.

The speed-change cable C is, as shown in FIGS. 14(a) to 14(d), 15 and so on, the mounting portion thereof is connected to an outward projection 62B2 provided at the side end of the one arm 62B of the derailleur arm unit 62. Therefor, the outward projection 62B2 at the side end of the arm 62B is provided with a mounting hole 62B3.

Mounting of the speed-change cable C to the outward projection 62B2 at the side end of the arm 62B is, as shown in FIGS. 14(a) to 14(d) and 15, achieved by inserting and fixing one end of the wire 52 to the mounting hole 62B3 provided on the projection 62B2.

The mounting hole 62B3 for mounting the operation wire 52 of the speed-change cable C is a through-hole having a large-diameter portion 62B4 and a small-diameter portion 62B5, whereby a slit-shaped cutting groove 62B6 is provided on the side of the hole 62B3.

On the other hand, there is provided a projecting portion 52a having a larger diameter than that of the wire 52 for fixing the wire 52 to the mounting hole 62B3 at one end of the operating wire 52. By inserting the wire 52 into the hole 62B3 from the side surface of the hole 62B3 along the slit-shaped cutting groove 62B6, and pulling a wire extension 52b extending from the small-diameter portion 62B5 of the hole 62B3 with a strong force, the projecting portion 52a is press-fitted to the large-diameter portion 62B4 of the hole 62B3 and abuts against, and is engaged with, a shoulder portion 62B7 between the large-diameter portion 62B4 and the small-diameter portion 62B5 of the hole 62B3. Consequently, the operating wire 52 is attached to the side end of the one of the arms 62B of the derailleur arm unit 62 whose one end is formed into a pair.

Figure 15:
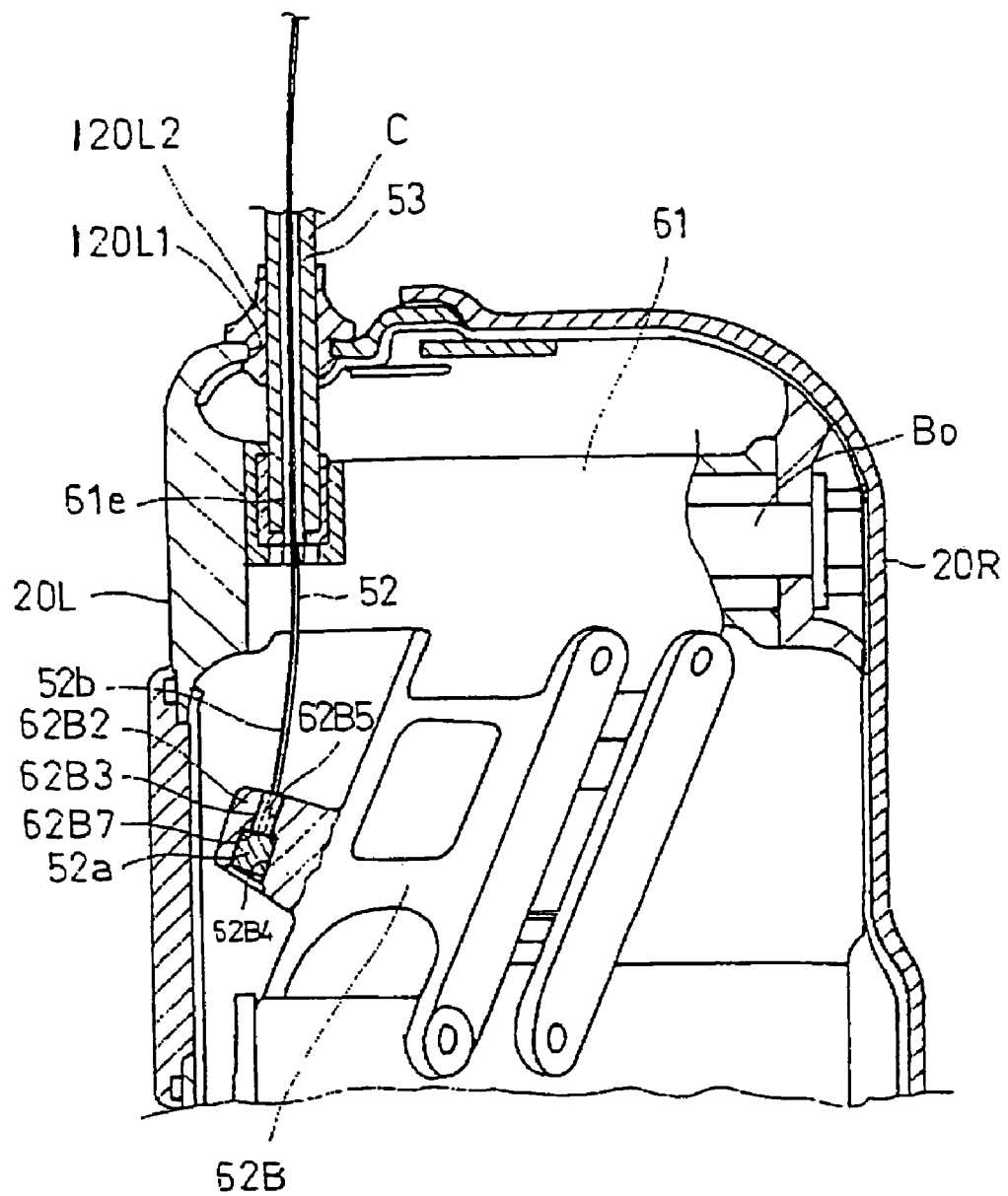
FIG. 15 is a drawing showing a mounting structure of the speed-change cable.

The speed-change cable C is formed by inserting the extension 52b of the operating wire 52 extending from the mounting hole 62B3 of the outward projection 62B2, which is the wire mounting portion on the side end of the arm 62B, into the outer cable via the mounting hole 61e of the outer cable 53 of the operating cable C for the derailleur shaft 61 as shown in FIG. 15. The operating wire 52 extends from a through-hole 120L1 provided at the portion of the left case 20L, which is a narrow case of the transmission case 20, facing an upper front of the vehicle body towards the speed-change operation mechanism 50 of the handle, and is attached at the extending end, which is the other end of the speed-change cable C, to the speed-change operation mechanism 50. The other end of the operating wire 52 extends from the mounting portion of the cable C on the speed-change operation mechanism 50 and is fixed to the speed-change operation member 51 of the mechanism 50 via means, not shown.

The speed-change cable C is guided to the speed-change operation mechanism 50 for extension so as to run along the inner wall of the case 20L at substantially the same distance to both of the mainframe 2 and the down tube 3 of the vehicle body frame F. Therefore, the through-hole 120L1 is provided at the position close to the side wall of the case 20L at substantially the same distance to the mainframe 2 and the down tube 3.

A seal member 120L2 is fitted to the through-hole 120L1, and the outer cable 53 of the speed-change cable C is tightly retained in the through-hole 120L1 via the seal member 120L2, whereby the cable C is strongly attached and retained to the case 20L in conjunction with mounting of the outer cable 53 by an outer cable mounting hole 61e of the derailleur shaft 61.

The speed-change cable C substantially extends from the wire mounting hole 62B3 of the derailleur arm 62B along the front frame of the vehicle body in substantially a straight direction (see FIGS. 1 and 2), for reducing the length of the speed-change cable C and for providing smooth movement of the operating wire 52, which is the inner cable. Thus, a reduction in the operating load due to the speed-change operation by the speed-change cable C is achieved.

Since the through-hole 120L1, which is the outlet port of the speed-change cable C, is provided on one case 20L of the transmission case, the operation for forming the through-hole 120L1 can be facilitated.

It is also possible to position the mounting portion of the transmission case 20 with respect to the vehicle body frame F on the extension of the speed-change cable C extending from the through-hole 120L1. In this case, the mounting of the transmission case 20 to the transmission case 20 and mounting of the speed-change cable C can be achieved simultaneously.

When the operating wire 52, which is an inner cable of the cable C is pulled during the speed-change operation, the speed-change cable C mounted to the derailleur arm 62B in the manner described above, the arm unit 62 including a pair of the derailleur arms 62A, 62B of parallel linkage, is rotated about the two supporting shafts 62a as the centers of rotation while being deformed to rise against the compression force of the compression spring 62b. In addition, the derailleur arm unit 62 is rotated about the two supporting shafts 62a as the centers of rotation while being deformed to be collapsed by the compression force of the compression spring 62b, so that the derailleur arm unit 62 is returned to the initial state.

As shown in FIGS. 9 and 10(a) to 10(c), a proximal end 63b of the derailleur body 63 is rotatably mounted to the distal ends of the derailleur arm unit 62 of parallel linkage, via a pair of supporting shafts 63a, the derailleur body 63 has a shape of substantially a flat cylindrical member which is deviated toward one side. A spring holder unit 63f in which a large-diameter torsion coil spring 63d and a small-diameter torsion coil spring 63e, disposed coaxially so as to surround the center boss 63c and wound in the same direction, are stored and provided inside the derailleur body 63.

A proximal end 64b of an arm member 64 is rotatably supported by a supporting pin 64a and extends at the position adjacent to the proximal end 63b of the derailleur body 63, that is, at the position adjacent to the mounting position of the derailleur body 63 with respect to the distal end of the derailleur arm unit 62 so as to be oppose to the spring holder unit 63f. See FIGS. 10(a) to 10(c). A guide pulley 65, described above, is rotatably journaled by a supporting shaft 65a in a space between the arm member 64 and the spring holder unit 63f of the derailleur body 63.

Journaling of the guide pulley 65 in the space by the rotatable supporting shaft 65a is achieved by the supporting shaft 65a inserted into through-holes 63g, 64c formed on the opposing surfaces of the derailleur body 63 and the arm member 64, and the guide pulley 65 is supported by a bearing 65c via a sleeve 65b fitted to the supporting shaft 65a.

As is understood characteristically from FIGS. 9, 10(a) to 10(c) and so on, the supporting shaft 65a can be provided in such a manner that an axis Z thereof extends in parallel with the axis X of the derailleur shaft 61. See FIGS. 10(a) to 10(c). This structure ensures maintenance of an adequate state of the speed-change chain 48 wound around the guide pulley 65.

Although rotatable journaling of the guide pulley 65 by the supporting shaft 65a is supported by the bearing 65c via the sleeve 65b as described above, as shown in FIGS. 10(a) to 10(c), the sleeve 65b is formed with annular shoulders 65b1, 65b2 at both ends of the outer periphery thereof, and proximal portions 72A1, 72B1 of a tensioner arm unit 72 include a pair of plate-shaped arms 72A, 72B that are swingably supported on the shoulders in pair.

The tensioner arm unit 72 including a pair of the tensioner arms 72A, 72B extending from the proximal portions 72A1, 72B1 by a predetermined length with the plate surfaces opposing to each other, and the arms in a pair are formed respectively with bosses 72A3, 72B3 having through-holes 72A2, 72B2 on the opposite surfaces in the vicinity of the distal ends thereof.

The position in the vicinity of the distal end of the tensioner arms 72A, 72B, the tensioner pulley 71 is rotatably supported between the bosses 72A3, 72B3 via a bearing 72b by a supporting shaft 72a inserted into the through-holes 72A2, 72B2 of the bosses 72A3, 72B3.

The distal end of the tensioner arm unit 72 is configured in such a manner that both of the tensioner arms 72A, 72B are integrally fixed to each other by the supporting shaft 72a.

As shown in FIG. 9, a projecting strip 72a1 projects from the surface of the arm 72A, which is one of a pair of the tensioner arms of the tensioner arm unit 72 located closer to the spring holder unit 63f of the derailleur body 63, and is provided to oppose the holder unit toward the holder unit 63f. The projecting end of the projecting strip 72a1 reaches the interior of the holder unit 63f.

The one end 63d1 of the outer spring 63d out of the two torsion coil springs 63d, 63e accommodated in the spring holder unit 63f is engaged with the projecting end of the projecting strip 72a1. The other end 63d2 of the spring 63d is engaged with the slot penetrated from the inner peripheral surface to the outer peripheral surface of the holder unit 63f. The spring 63d provides a rotational force in the clockwise direction in FIG. 6 to the tensioner arm unit 72.

The inner spring 63e is a torsion coil spring which is wound in the same direction as the outer spring 63d. One end thereof is engaged with the tensioner arm 72A at the side of the arm in the vicinity of the proximal portion thereof, although not shown clearly. The other end is engaged with the slot formed on an intermediate annular rib 63f1 of the holder unit 63f. The spring 63e provides a rotational force in the clockwise direction, which is the same direction as the outer spring 63d, to the tensioner arm unit 72, and these two springs 63d, 63e cooperate and provide a reaction force against a counterclockwise swinging movement of the tensioner arm unit 72 by the resilient force of these springs.

The tensioner arm unit 72 is adapted, by means of the tensioner pulley 71 rotatably journaled at the distal end thereof, to provide an adequate tension generated by the resilient force of the torsion coil springs 63d, 63e to the speed-change chain 48 wound around the pulley 71. The speed-change chain 48 has a winding structure wound on the drive sprocket 31 journaled by the crankshaft 12 via the one-way clutch 42. The sliding mechanism S moves clockwise in FIG. 6, and is wound on the tensioner pulley 71 clockwise, passed between the pivot shaft 8 and the guide pulley 65 and wound on the guide pulley 65 counterclockwise, and subsequently wound on the sprocket of the speed-change sprocket unit 40.

The derailleur 60 has the above-described mounting structure, and the derailleur 60 having the derailleur arm unit 62 of parallel linkage supported by the derailleur shaft 61 via the supporting shaft 62a of the protruding portion 61c receives an operating force generated by pulling and slackening of the wire 52, which is an inner cable of the speed-change cable C, according to the speed-change operation of the speed-change operation member 51. The derailleur arm unit 62 of parallel linkage is rotated by a compression force of the compression spring 62b or against the compression force, thereby generating a swinging motion for shifting the speed-change chain 48 among the multi-stage speed-change sprockets 41-47.

The rotation of the derailleur arm unit 62 of parallel linkage is done about the two parallel supporting shafts 62a having the axes Y which intersect the derailleur shaft 61 at a predetermined angle at the centers of rotation. When the arm unit 62 is rotated, the derailleur body 63 at the distal end of the arm unit 62 rotates with respect to the arm unit 62 about the supporting shaft 63a while maintaining the position shown by an imaginary line shown in FIG. 6 and keeping the rotational angle of the arm unit 62 about the supporting shaft 63a irrespective of the rotational movement of the arm unit 62. Accordingly, the rotation and movement of the guide pulley 65 in association with the rotation and swinging movement of the derailleur arm unit 62 occurs at a speed-change operation, and irregular rotation and variations of the speed-change chain 48 wound around the guide pulley 65 are prevented.

By the above-described rotation of the derailleur arm unit 62 about the supporting shaft 62a, the guide pulley 65 attached to the derailleur body 63 via the supporting shaft 65a is moved, as shown in FIGS. 3 to 6 and so on. For example, from the speed-change sprocket 47 having the smallest outer diameter to the speed-change sprocket 41 having the largest outer diameter in the multi-stage speed-change sprocket unit 40, or from the speed-change sprocket 41 having the largest outer diameter to the speed-change sprocket 47 having the smallest outer diameter (see the position indicated by a solid line and the position indicated by an imaginary line), so that the speed-change chain 48 is shifted to a desired speed-change sprocket in the multi-stage speed-change by the speed-change mechanism M1 described later by the movement of the guide pulley 65.

The range of movement of the guide pulley 65 in association with the rotation of the derailleur arm unit 62 of parallel linkage is the range from the first position, indicated by the solid line, closest to the output shaft 15 in FIG. 6, which corresponds to the initial state of the derailleur arm unit 62 because of the action of the compression spring 62b, to the second position, indicated by the imaginary line, farthest from the shaft 15. In the present embodiment, speed change from the seventh speed, which is the highest speed, to the first speed, which is the lowest speed, is performed during the movement from the first position indicated by the solid line to the second position indicated by the imaginary line. In other words, the speed-change chain 48 is shifted from the sprocket 47 having the smallest outer diameter to the sprocket 41 having the largest outer diameter in the speed-change multi-stage sprocket unit 40.

In association with the movement of the guide pulley 65 for shifting the speed-change chain 48 to the respective stages of speed-change sprockets, the tensioner 70 is subjected to a pressing force due to the change of tension of the speed-change chain 48. Accordingly, the tensioner arm unit 72 rotates about the supporting shaft 65a of the guide pulley 65, and is moved from the first position, which is the initial position indicated by the solid line in FIG. 6 to the second position indicated by the imaginary line.

The tensioner arm unit 72 can always provide an adequate magnitude of tension to the speed-change chain 48 by the action of the torsion coil springs 63d, 63e accommodated in the spring holder unit 63f at the moved positions, that is, the first position indicated by the solid line, at the second position indicated by the imaginary line, and the intermediate position between thereof, whereby slaking of the speed-change chain 48 is prevented.

The basic structure of the derailleur 60 having the speed-change cable C of the present embodiment is as described above.

As illustrated in FIG. 6 an alignment mechanism 80 of the speed-change chain 48 is provided. Therefore, a brief description of the alignment mechanism 80 of the speed-change chain 48 will be added.

In FIG. 6, a chain guide member 81 for aligning the speed-change chain 48 is provided in a path of the speed-change chain 48 wound between the delivering side of the chain 48 of the speed-change sprocket unit 40 and the retracting side of the chain 48 of the above-described drive sprocket 31.

Figure 16:
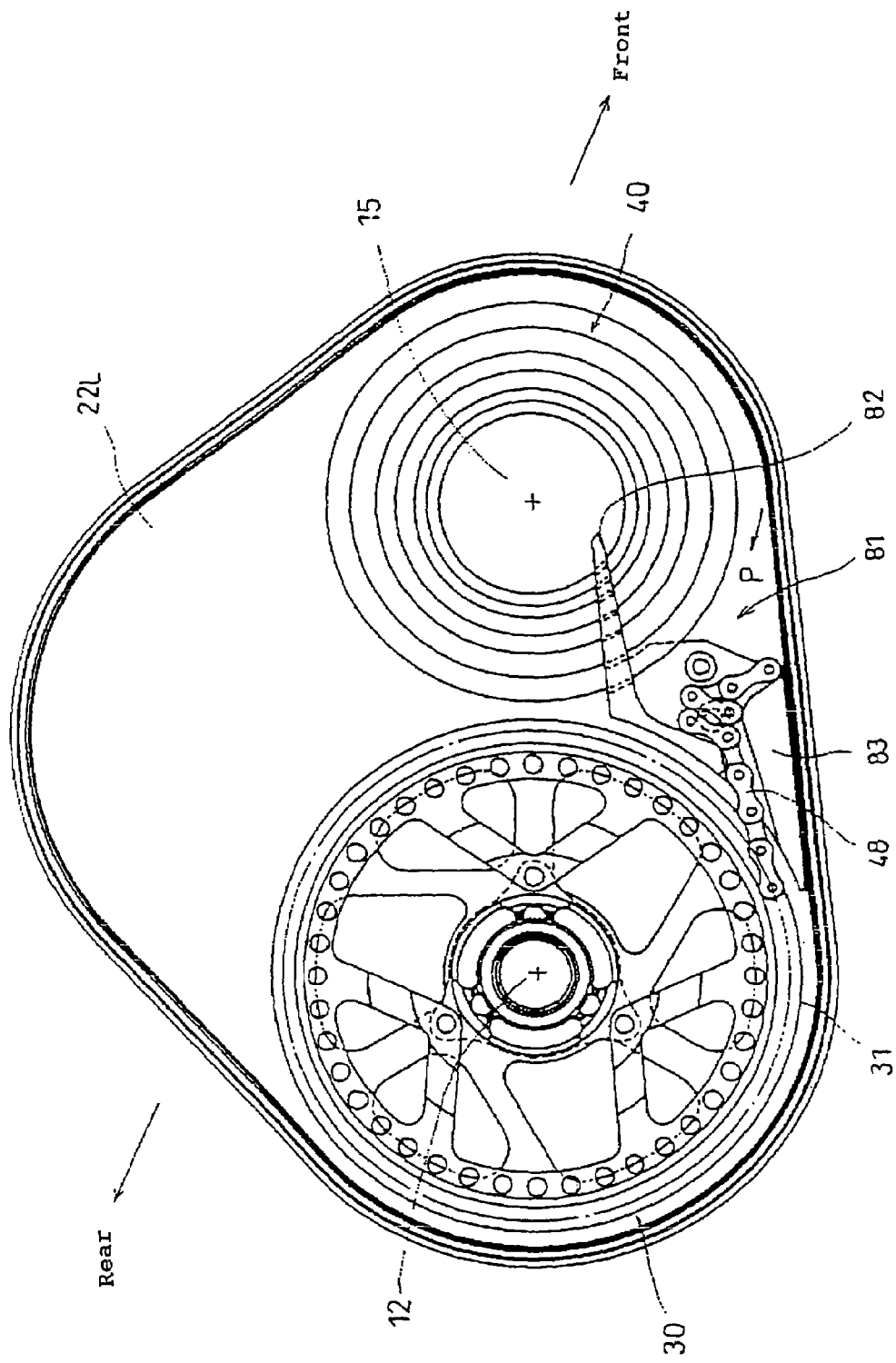
FIG. 16 is a drawing showing a structural portion relating to the alignment of speed-change chains in a transmission case.
Figure 17A:
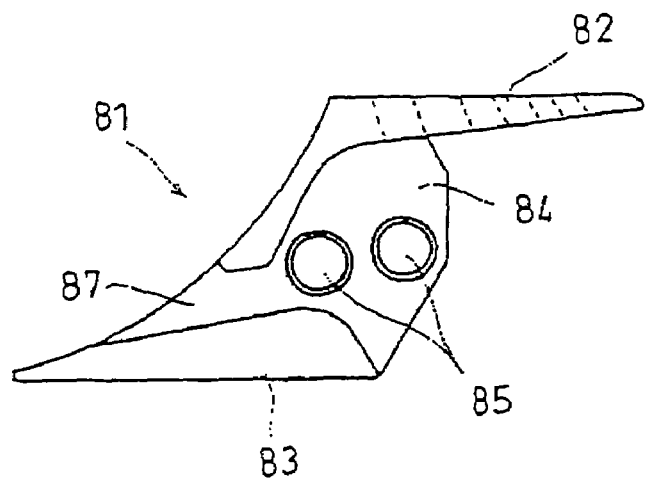
FIGS. 17(a) and 17(b) shows a chain guide member in which 17(a) is a side view of the chain guide member and 17(b) is an upper view of the chain guide member.
Figure 17B:
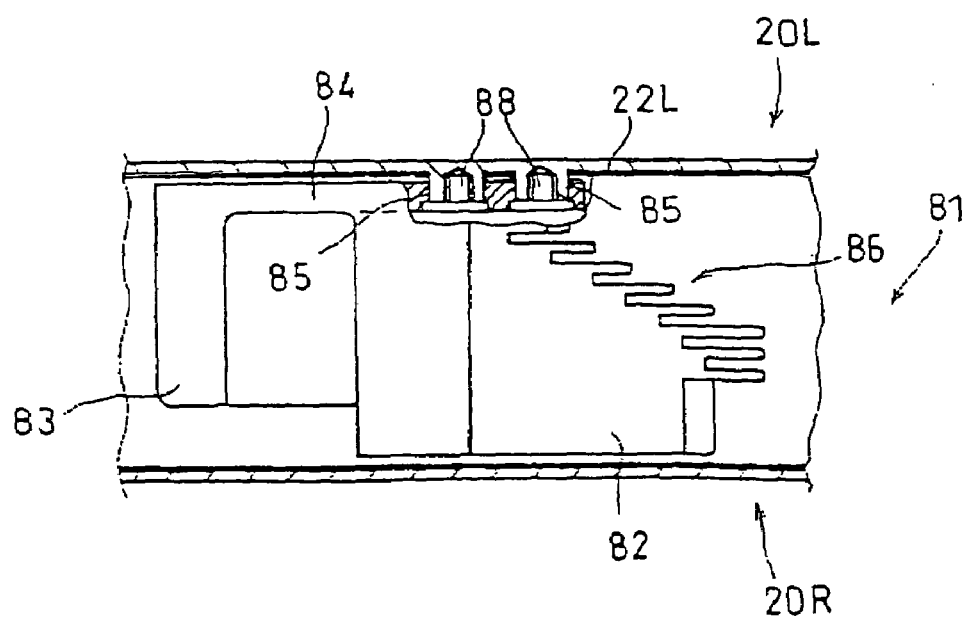

FIG. 16 is a right side view showing only the members relating to the alignment of the speed-change chain 48 in the case 20 for showing the respective positional relation among the above-described speed-change sprocket unit 40, the drive sprocket 31, and the chain guide member 81. FIG. 17(a) is a side view of the above-described chain guide member 81, and FIG. 17(b) is an upper view of the chain guide member 81. The above-described chain guide member 81 is formed of synthetic resin, and an upper guide member 82, disposed on the upper side of the chain path, a lower guide member 83, disposed on the lower side of the chain path, and an interconnecting member 84 for connecting the above-described both guide members are provided.

The upper guide member 82 is an upper movement limiting member of the speed-change chain 48. Tthe lower guide member 83 is a lower movement limiting member of the speed-change chain 48. The above-described members are both integrated by the interconnecting member 84 into one part. The interconnecting member 84 is formed with two bolt holes 85. As shown in FIG. 17(b), the chain guide member 81 is fixed to the left reinforcing member 22L of the case 20L via a bolt 88 to be inserted into the bolt hole 85.

The chain guide member 81 is, as shown in FIG. 6 and FIG. 16, disposed at the mid point between the speed-change sprocket unit 40 and the drive sprocket 31. The above-described upper guide member 82 is provided at the position overlapped with the multi-stage speed-change sprocket unit 40 in a side view.

The surfaces of the upper and lower guide members 82, 83 on the side of passage of the speed-change chain extend in parallel with each other when viewed in the direction of movement of the speed-change chain 48, and are formed so that the width sufficient for allowing the speed-change chain 48 to pass between the upper and lower guide members 82, 83 is secured.

As shown in FIG. 17(b), the distal end on the side of the speed-change sprocket unit 40 on the upper guide member 82 is formed with an inclined comb-shaped portion 86. The respective comb teeth are inserted into the gaps of the serrated edges of the respective speed-change sprockets 41-47. When shifting the speed-change chain 48, the speed-change chain 48 is reliably removed from any one of the speed-change sprockets 41-47 to which the speed-change chain 48 engages, and the speed-change chain 48 is delivered toward the drive sprocket 31.

As shown in FIG. 17(a), a throat portion 87 for limiting the position of the speed-change chain 48 passing therethrough in the vertical direction into a narrow space is provided on the side of the drive sprocket 31 of the chain guide member 81. This is a portion where the vertical width of the path of the speed-change chain 48 is narrowed.

Subsequently, a tension adjusting mechanism for the rear wheel drive chain 18 provided in the present embodiment will be described.

Figures 18A, 18B:
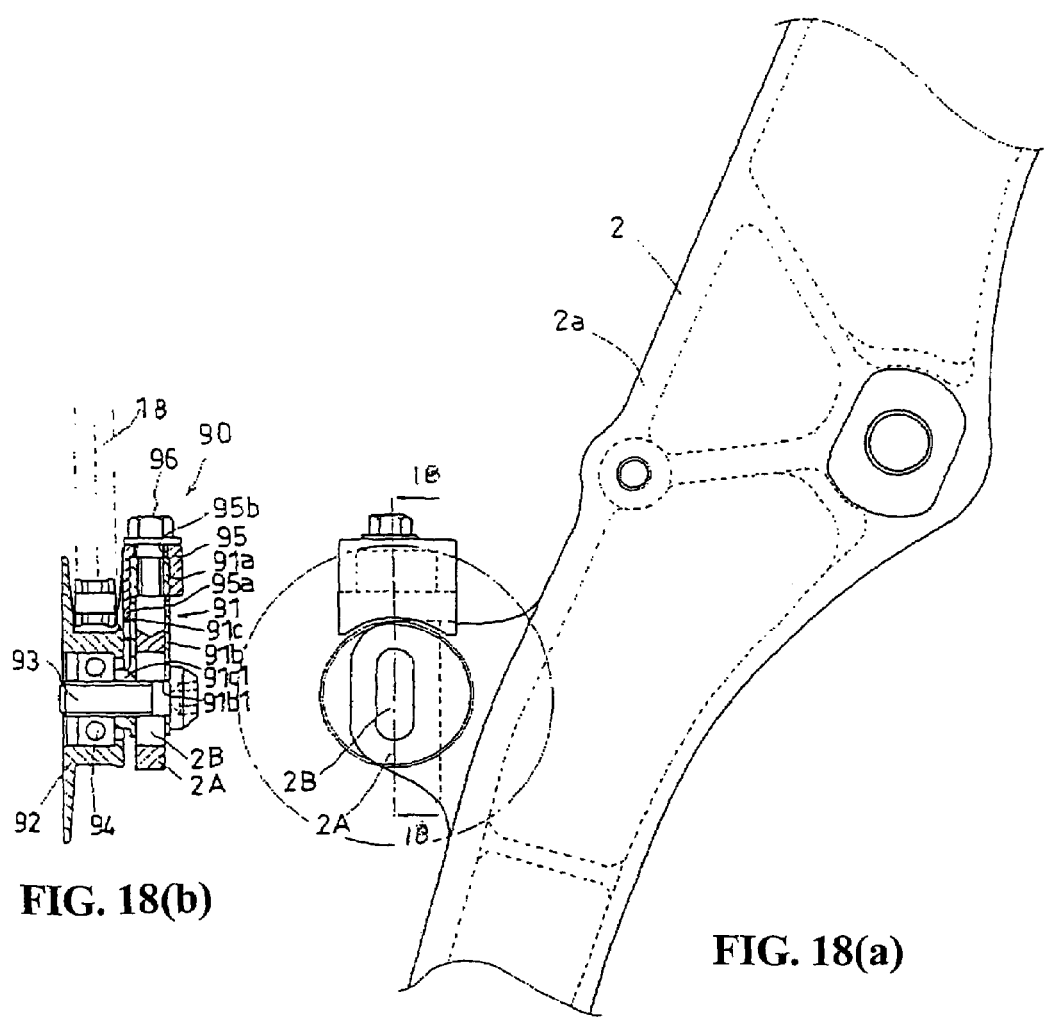
FIGS. 18(a) and 18(b) are illustrations showing a chain tension adjusting mechanism in which 18(a) is a drawing showing the state of arrangement thereof on the rear portion of the main frame, and 18(b) is a cross-sectional view taken along the line 18-18 in 18(a)

As shown in FIG. 18, a chain tension adjusting mechanism 90 for adjusting the extension of the rear wheel drive chain 18 is provided. The tension adjusting mechanism 90 of the chain 18 is provided on a projecting strip 2A formed so as to project rearwardly from the rear portion 2a of the mainframe 2 adjacent to the traveling path of the rear drive chain 18. The projecting strip 2A is formed with an elongated hole 2B.

A roller holding member 91 having a head portion 91a formed with threads and a pair of plate-shaped clamping strips 91b, 91c extending from the head portion 91a is provided. One of a pair of the plate-shaped clamping strips 91b, 91c of the roller retaining member 91 is formed with an opening 91b1 through which a tightening bolt 93, which serves substantially as a shaft for supporting a roller 92, is inserted. The other one 91c of plate-shaped clamping strips is formed with a boss 91c1 formed with a female screw for the tightening bolt 93 is inserted.

The roller holding member 91 is clamped between a pair of the plate-shaped clamping strips 91b, 91c from both sides of the peripheral portion of the elongated hole 2B including the elongated hole 2B of the projecting strip 2A, and is held on the projecting strip 2A by inserting the tightening bolt 93 from the opening 91b1 of the one of the clamping strips 91b and screwing and tightening the bolt 93 passed through the elongated hole 2B into the screw hole of a boss 91c1 of the other clamping strip 91c.

The roller 92 is rotatably supported by the extending portion of the tightening bolt 93 projecting from the screw hole of the boss 91c1 of the plate-shaped clamping strip 91c via a bearing 94. The head portion 91a of the roller holding member 91 described above is provided with a holding member 95 having a groove-shaped structure formed by being bent into angular C-shape for clipping and covering the head portion 91a. A leg 95a includes lateral ends that abut against and are fixed to the projecting strip 2A. The holding member 95 is formed with an unloaded hole 95b through which an adjust bolt 96 passes through on top thereof.

Therefore, in order to adjust the tension of the rear wheel drive chain 18, by loosening the tightening bolt 93 which serves as a shaft for substantially supporting the roller 92 and rotating the adjust bolt 96 inserted through the unloaded hole 95b of the holding member 95 and screwed into the screw hole of the head portion 91a of the roller holding member 91 in the lateral direction, the roller holding member 91 moves along the elongated hole 2B on the projecting strip 2A in the vertical direction. Thus, the degree of abutment of the roller 92 with respect to the chain 18 is adjusted. When an adequate tension adjustment of the chain 18 is achieved, the tightening bolt 93 may be tightened again and the roller holding member 91 is fixed with respect to the projecting strip 2A.

Figure 19:
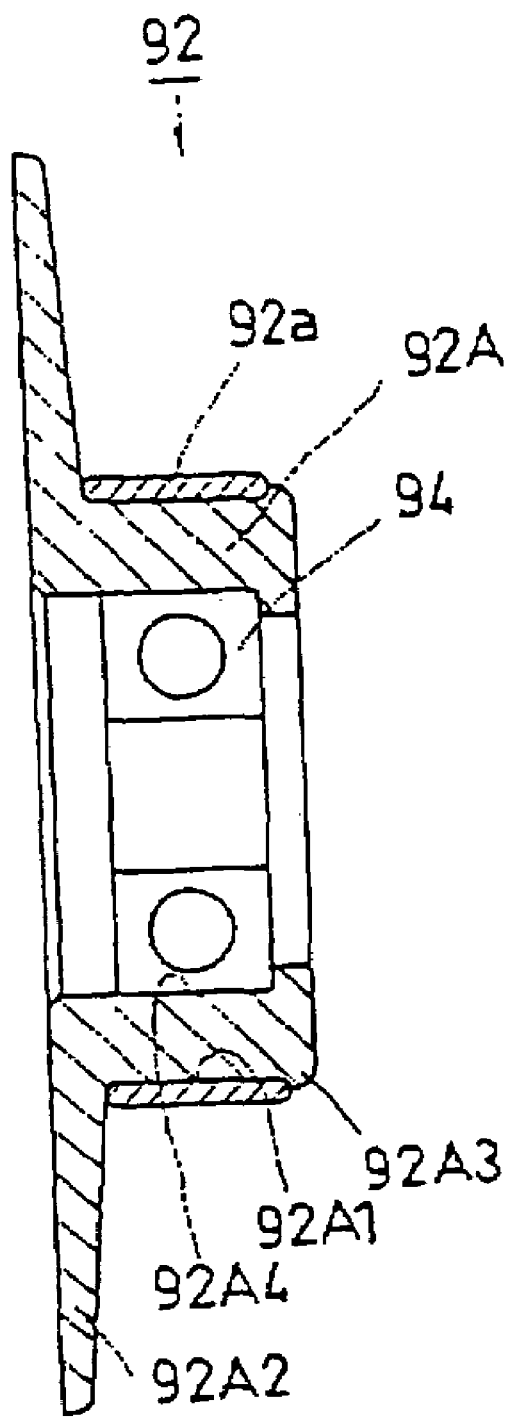
FIG. 19 is a cross-sectional view of a roller of the chain tension adjusting mechanism.
Figure 20A:
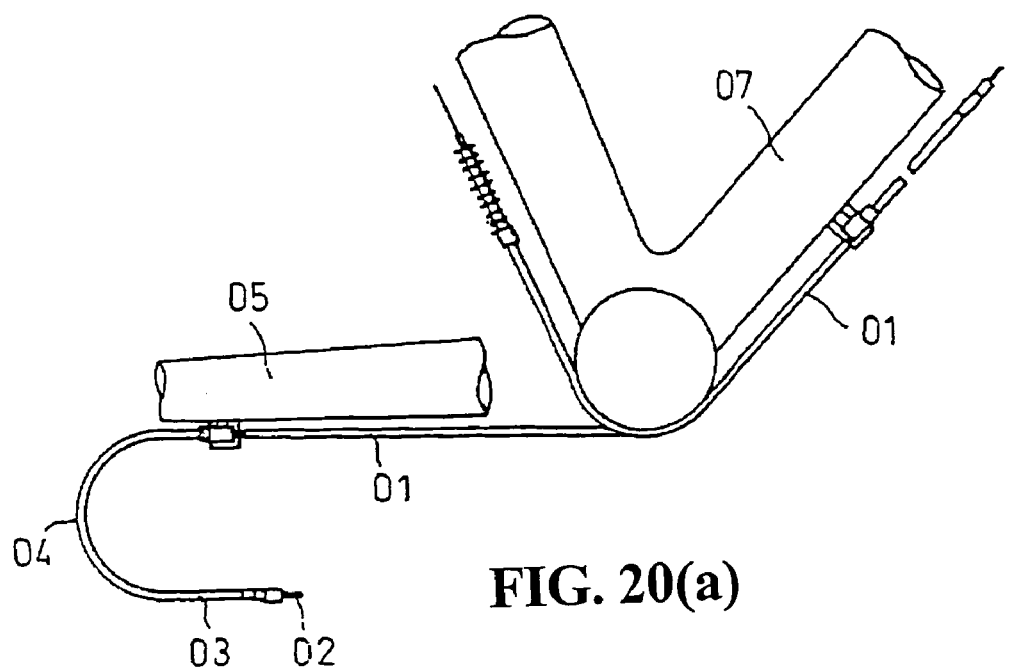
FIGS. 20(a) and 20(b) show the state of arrangement of the derailleur operating cable in the related art, in which 20(a) and 20(b) showing the different modes, respectively.
Figure 20B:
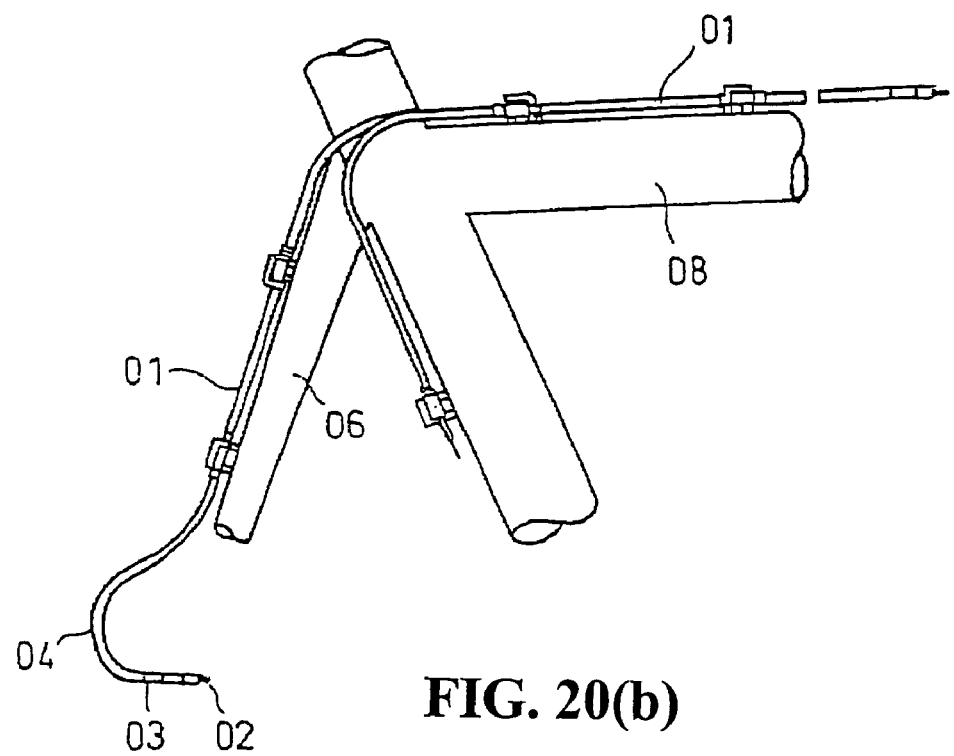

The roller 92 has a structure shown in FIG. 19.

In other words, the roller 92 is provided with an annular portion 92A1 to which the chain abuts on the outer periphery of the roller body 92A formed of metal such as aluminum alloy or hard resin. An annular flange 92A2 is provided for preventing the chain from coming off provided at the left end of the annular portion 92A1 in the drawing, and an annular small projection 92A3 provided at the right end of the annular portion 92A1 in FIG. 18. An annular chain abutting member 92a, formed of hard rubber or the like, is fitted and fixed to the annular portion 92A1 between the flange 92A2 and the small projection 92A3. On the inner periphery of a roller body 92A, a recess 92A4 is provided with the bearing 94 being fitted in and fixed to the recess 92A4.

The operation of this embodiment configured as described above will be described.

When a person riding on the bicycle B presses the pedal 13a, the crankshaft 12 is rotated in the normal direction P, and the rotation is transmitted from the crankshaft 12 to the drive sprocket 31, and then to the speed-change mechanism M1 through the speed-change chain 48. In the speed-change mechanism M1, a desired speed-change sprocket is selected by the speed-change operation of the person riding on the bicycle B. The rotational change in speed via the sprocket is transmitted to the rear wheel Wr via the output shaft 15, the rear wheel drive sprocket 16, the rear wheel drive chain 18, and the rear wheel driven sprocket 17, whereby the rear wheel Wr is rotated and travels at a speed desired by the person riding on the bicycle B.

The above-described speed change effected by the speed-change mechanism M1 is achieved by the following operation.

When the person riding on the bicycle B pushes the pedal 13a and rotates the crankshaft 12 in the forward direction P in a state in which the speed-change sprocket 47 is selected from a group of the speed-change sprockets 41-47 as the operating sprocket, that is, in a state in which the seventh position is selected as the gear position by the derailleur 60 having the derailleur arm unit 62 at the initial position, which is the position indicated by the solid line in FIG. 6, that is, at the first position, the drive sprocket 41 is rotated in the forward direction P via the one-way clutch 42 and the sliding mechanism S by the rotation of the crankshaft 12.

The speed-change sprocket 47, the output shaft 15, and the rear wheel drive sprocket 16 are rotated by the drive sprocket 41 driven in the forward direction P via the speed-change chain 48 at the maximum speed-change ratio on the high-speed side determined by both sprockets 31, 47.

The motive power of the crankshaft 12 rotated by the person riding on the bicycle B is transmitted to the output shaft 15 via the drive sprocket 31, the speed-change chain 48 and the speed-change sprocket 47. The motive power of the output shaft 15 is transmitted to the real wheel Wr via the drive force transmission mechanism, whereby the bicycle B travels at the seventh speed.

When the speed-change operation member 51 is operated to select the speed-change sprocket on the low-speed side, for example, the speed-change sprocket 41 as the operating sprocket in order to shift the speed position by the derailleur 60 from the position of the seventh speed, the derailleur arm unit 62 of parallel linkage is rotated in the rising direction about the two supporting shafts 62a in a pair provided on the projecting portion 61c and intersecting the axis X of the derailleur shaft 61 by a predetermined angle and against a spring force of the compression spring 62b by a pulling force of the operating wire 52, which is the inner cable of the speed-change cable C.

The derailleur arm unit 62 of parallel linkage is moved from the initial position, which is the position indicated by the solid line, to the position indicated by the imaginary line by rotation. In association with the movement of the derailleur arm unit 62, the guide pulley 65 at the distal end of the arm is moved from the initial position indicated by the solid line, that is, from the position of the seventh speed described above, to the position indicated by the imaginary line, that is, to the position of the first speed described above. In the course of movement of the guide pulley 65, the speed-change chain 48 is shifted from the speed-change sprocket 47 to the speed-change sprocket 41 going through the intermediate speed-change sprockets 46-42 in sequence, and the sprocket 41 is driven and connected to the drive sprocket 31 via the speed-change chain 48.

More specifically, the guide pulley 65 at the distal end of the derailleur arm unit 62 is moved from the position indicated by the solid line in FIG. 6 to the gear position indicated by the imaginary line, and when the guide pulley 65 is at the position indicated by the imaginary line, the speed-change chain 48 is shifted to the sprocket 41 on the minimum speed side, that is, the position of the first speed, whereby the bicycle B travels at the minimum speed, that is, at the first speed.

The movement of the chain 48 in association with the above-described movement of the guide pulley 65 for shifting the speed-change chain 48 exerts a tension of the chain 48 to the drive sprocket 31. On the other hand, since the drive sprocket 31 is movable in the direction of the axis of the crankshaft 12 by the sliding mechanism S as shown in FIG. 3 to FIG. 5, the drive sprocket 31 is moved by the tension of the speed-change chain 48 in the direction of the axis of the crankshaft 12. More specifically, by a component force in the direction of the axis of the crankshaft 12, and is shifted to the position indicated by the imaginary line in FIG. 3 to FIG. 5.

The tension of the chain 48 generated by the shifting of the speed-change chain 48 in association with the aforementioned movement of the guide pulley 65 acts on the tensioner pulley 71, and causes the tensioner arm unit 72 to rotate about the supporting shaft 65a of the guide pulley 65 against the spring force of a torsion springs 65d, 65e which are the tensioner springs, so that the tensioner pulley 71 that is journaled via a shaft at the distal end of the arm unit 72 is moved from the position indicated by the solid line, which is the initial position, to the position indicated by the imaginary line as shown in FIG. 6.

The tensioner pulley 71 takes a position to provide a tension of a suitable magnitude to the speed-change chain 48 by the tensioner springs 65d, 65e at its shifted position. See imaginary line in FIG. 6.

On the other hand, when the speed-change operation member 51 is operated to loosen the operating wire 52, which is the inner cable of the speed-changing cable C, and any one of the speed-change sprockets 42-47 on the side of the higher speed than the speed-change sprocket 41 is selected, the derailleur arm unit 62 of parallel linkage is moved to return to the direction toward the above-described initial position by a spring force of the compression spring 62b which urges the parallel linkage to the initial state.

Then, by the movement of the guide pulley 65 in association with the transition of the derailleur arm unit 62, the guide pulley 65 selects a desired one from the speed-change sprockets 42-47 on the high-speed side, and in association with the selection, the speed-change chain 48 is shifted to the selected desired speed-change sprocket on the high-speed side.

In the gear shifting operation from the low-speed side to the high-speed side as well, the drive sprocket 31 supported by the crankshaft 12 via the speed-change chain 48 is moved in the direction of the axis of the crankshaft 12 via the above-described sliding mechanism S by the action of the tension of the speed-change chain 48 generated by the movement of the guide pulley 65 in association with the transition of the derailleur arm unit 62. Thus, the drive sprocket 31 is moved to a new gear position in the direction of the axis of the crankshaft 12, that is, to the position corresponding to the desired speed-change sprocket on which the speed-change chain 48 is wound. See FIG. 3 to FIG. 5. Thus, the bicycle B travels in the desired speed-change ratio at this new gear position.

In brief, when the speed-change operation member 51 is operated for shifting the gear position, the derailleur arm unit 62, the guide pulley 65, and the tensioner pulley 71 are moved toward the desired gear position via the speed-change cable C, and one of the speed-change sprockets is selected from a group of the speed-change sprockets 41-47, whereby the speed-change chain 48 is wound around the selected speed-change sprocket by the derailleur 60.

The drive sprocket 31 on the axis of the crankshaft 12 is moved to a position corresponding to the selected speed-change sprocket along the crankshaft 12 by the tension of the chain generated when the speed-change chain 48 is shifted. Thus, the drive connection between the speed-change sprocket and the drive sprocket 31 on the crankshaft 12 is achieved by the speed-change chain 48 aligned at a suitable position without being twisted.

Since this embodiment is configured as described above, and operated as described above, the following specific effects are achieved.

By mounting the operating wire 52 which is the inner cable of the speed-change cable C to the mounting portion formed on the outward projection 62B2 on the side end of one of the arm 62B of the derailleur arm unit 62, inserting the wire 52 from the side cutting groove 62B6 of the mounting hole 62B3 opened on the projection 62B2, and strongly pulling the wire portion 52b extending from the mounting hole 62B3, the projecting portion 52a of the wire end is press-fitted into the large-diameter portion 62B4 of the hole and comes into abutment with the shoulder portion 62B7 of the hole, and is mounted to the outward projection 62B2 of the derailleur arm 62B. Therefore, mounting is achieved extremely easily and the operability for mounting is extremely good.

Since the wire extension 52b extending from the mounting hole 62B3 of the derailleur arm 62B extends straight toward the substantially upper front of the vehicle body, and is inserted into the outer cable 53 at the mounting hole 61e of the outer cable 53 of the derailleur shaft 61, the speed-change cable C extends from the through-hole 120L1 on the upper portion of the transmission case 20L to be substantially straight towards the speed-change operation mechanism 50 of the handle. Therefore, the length of the speed-change cable C is significantly reduced. In addition, since the cable C does not form a curved portion which is forcedly bent, there is little friction between the operating wire 52, which is the inner cable, and the outer cable 53. Thus, a smooth movement of the operating wire is ensured, whereby the speed-change operating load on the operating wire 52 is significantly reduced.

The derailleur arm unit 62 includes a pair of the arms 62A, 62B of parallel linkage, and the arm is attached to the derailleur shaft 61 while being rotatably supported via the supporting shaft 63a whose axis Y is oriented so as to intersect the axis X of the derailleur shaft 61 at a predetermined angle. A desired speed-change sprocket is selected by the movement of the guide pulley 65 in association with the rotation of the arm unit 62 by pulling or slackening of the operating wire 52 of the speed-change cable C at the time of speed-change operation. Thus, shifting of the speed-change chain 48 is achieved. Therefore, the derailleur 60 is adequately and reliably guided and smooth movement of the derailleur 60 for speed change is ensured.

Since mounting of the derailleur 60 is achieved by the derailleur arm unit 62 having a simple structure including a pair of the arms 62A, 62B of a parallel linkage as described above, and the operation for moving the derailleur 60 is also simple, little mechanical operational loss due to frictional forces or the like occurs during operation. Therefore, the operating force of the operating wire 52 of the speed-change cable C can be significantly reduced. Thus, a smooth speed-change operation can be achieved with a relatively small operating force.

Since the supporting shaft 65a of the guide pulley 65 mounted to the distal end of the derailleur arm unit 62 extends in parallel with the derailleur arm shaft 61, guiding of the chain 48 for shifting the speed-change chain 48 during speed-change operation can be achieved smoothly, accurately, and reliably.

Since a structure in which the lower ends of the mainframe 2 and the down tube 3 are connected by the under tube 4 with respect to each other is employed as the structure of the frame of the bicycle B, the rigidity of the frame F is enhanced. In addition, the transmission case 20, supported by the frame F, is mounted and supported by the lower end of the rear portion of the mainframe 2 and the under tube 4 at the structural portion surrounded by the mainframe 2, the down tube 3, and the under tube 4. Therefore, a strong and stable mounting is achieved.

Since the bosses 20L1, 20R1, projecting inwardly from the left and right transmission cases 20L, 20R, are provided on the identical axis, and the derailleur shaft 61 of the transmission is supported by the left and right bosses 20L1, 20R1, the derailleur shaft 61 is supported at both ends. Therefore, mounting rigidity of the derailleur shaft 61 is improved. Thus, the mounting state of the shaft 61 is extremely stable. Also, since it is not necessary to increase the thickness of the derailleur shaft 61 without necessity, a weight reduction of the shaft 61 is achieved. Thus, downsizing and weight reduction of the mounting structure itself of the derailleur shaft 61 is achieved.

Since the rigidity of the mounting structure of the derailleur shaft 61 is enhanced, the stable state of the derailleur shaft 61 can be maintained even when an offset load is exerted when changing the speed. Thus, improved operability during speed-change operation is achieved. In addition, since the connecting portion between the left and right transmission cases 20L, 20R can be used also as the supporting portion of the derailleur shaft 61, a simplification of the case structure is achieved.

Since the derailleur shaft 61 is provided with the hole 61b at the shaft-end projection 61a and the mounting position with respect to the transmission case 20L is determined by the stopper pin 61A inserted into the hole 61b, the mounting accuracy is improved, and positioning at the time of mounting is extremely easy. Since the tightening bolt Bo is disposed inwardly of the width of the transmission case 20, it does not project in the direction of the width of the case 20.

The bicycle B on which the transmission T according to the present invention is mounted is a down-hill bicycle used for a competitive sport for competing against time for running down a dirt course such a forest road provided with a high-speed corner or a jumping section. When the bicycle B is traveling along the sharp curve, the speed-change chain 48 wound around the drive sprocket unit 30 and the speed-change sprocket unit 40 is shifted by a centrifugal force in the opposite direction from the direction in which the bicycle B turns. Thus, the speed-change chain 48 may come off the teeth of the drive sprocket 31 of the drive sprocket unit 30. In addition, the bicycle B may be moved heavily in the vertical direction. Thus, the speed-change chain 48 may come off the drive sprocket 31.

However, the coming off of the speed-change chain 48 as described above may be prevented by the chain guides 37 provided on both sides of the outer periphery of the drive sprocket 31 shown in FIG. 3 to FIG. 5.

During travel of the bicycle B, when the crankshaft 12 is turned in the reverse direction or stopped by the person riding on the bicycle B, the bicycle B travels by inertia. More particularly, when the bicycle B is running downhill, the bicycle B continues to travel and hence the rear wheel Wr continues to rotate. However, in the embodiment of the present invention, there is a friction member such as an O-ring interposed between the hub Wr1 of the rear wheel Wr and the driven sprocket 17. Thus, the rear wheel hub Wr1 and the driven sprocket 17 are frictionally connected to each other via the friction member.

Therefore, during the inertia traveling of the bicycle B, the rotation of the rear wheel Wr is transmitted from the rear wheel Wr to the rear wheel driven sprocket 17, the rear wheel drive chain 18, the rear wheel drive sprocket 16, and the output shaft 15, the speed-change sprocket unit 40, the speed-change chain 48. Thus, the speed-change chain 48 is positively rotated even during the inertial traveling, and the speed-change operation during the inertial traveling can be easily performed.

In this embodiment, since the chain alignment mechanism 80 is provided, the speed-change chain 48 which is slackened on the side of the speed-change sprocket unit 40 of the chain guide member 81 is linearly aligned at the throat portion 87, and is guided by the drive sprocket 31 smoothly.

When the drive sprocket 31 is passively rotated during inertia traveling, there may be the case in which smooth movement of the chain 48 is not ensured when the traveling surface has minute fluctuations or when the person riding on the bicycle B suddenly stops pushing of the pedals irrespective of provision of the tension force by the tensioner spring of the chain tensioner 70 to the speed-change chain 48. However, since the chain guide member 81 is provided, occurrence of such event can be prevented reliably in advance.

There may be the case wherein the speed-change chain 48 is slackened by being pressed from the delivery side on the lower side of the speed-change sprocket unit 40 to the retracting side of the drive sprocket 31, or by being caught into the retracting side of the drive sprocket 31 due to such slackening, so that the speed-change chain 48 cannot be retracted smoothly. However, since the speed-change chain 48 which is slackened on the side of the speed-change sprocket unit 40 of the chain guide member 81 is linearly aligned at the throat portion 87, the chain 48 is smoothly guided and wound around the drive sprocket.

The chain guide member 81 is disposed at the midpoint between the speed-change sprocket unit 40 and the drive sprocket 31, and the surfaces of the upper and lower guide members 82, 83 on the side of passage of the chain extend in parallel with each other when viewed in the direction of movement of the speed-change chain 48, and is formed so that the width sufficient for allowing the speed-change chain 48 to pass through is secured. Therefore, even when the speed-change chain 48 is moved in the direction of the axis of the output shaft when shifting the speed-change chain 48, the speed-change chain 48 can be guided smoothly.

Since the distal end of the above-described upper guide member 82 on the side of the speed-change sprocket unit 40 is formed with the inclined comb-shaped portion 86, the respective comb teeth are inserted into the gaps of the serrated edges of the respective speed-change sprockets 41-47, and when shifting the speed-change chain 48, upward movement of the speed-change chain 48 is reliably limited to deliver the speed-change chain 48 toward the drive sprocket 31 smoothly.

Since the throat portion 87 for limiting the position of the speed-change chain 48 passing therethrough in the vertical direction into a narrow space is provided on the side of the drive sprocket 31 of the chain guide member 81, the speed-change chain 48 delivered from the throat portion 87 can arrive at the serrated position of the drive sprocket 31 in a tangential state.

Furthermore, in this embodiment, since the tension adjusting mechanism 90 for adjusting the tension of the rear wheel drive chain 18 is provided, the slackening due to extension of the chain 18 can be adjusted as needed, and smooth chain drive is ensured. Since the chain tension adjusting mechanism 90 is provided at the position adjacent to the traveling path of the rear wheel drive chain 18 below the rear portion of the mainframe 2, a sufficient working space is ensured. Thus, the operation for adjustment can be performed easily and good operability is achieved.

The chain tension adjusting mechanism 90 is simple in structure, and the operation for tension adjustment of the chain 18 can be performed easily by simply loosening the tightening bolt 93 and rotating the adjust bolt 96. Therefore, rapid and adequate adjustment operation of the chain can be performed extremely efficiently irrespective of its simple structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement structure of a speed-change cable comprising:
   a primary frame of a vehicle body extending obliquely rearwardly and downwardly from a head pipe which rotatably supports a handle and a transmission case supported by the primary frame,
   the transmission case having an internal space accommodating a transmission having a derailleur; and
   the transmission including a pedal crankshaft and an output shaft having axes that are separate from each other;
   wherein the transmission case includes:
      a through-hole at a portion facing forward or upwardly of the vehicle body; and
      a speed-change cable for causing the transmission to change the speed is passed through the through-hole,
   wherein one end of the speed-change cable is operatively connected to the derailleur in a position that is forward with respect to the axis of the pedal crankshaft and above and rearward with respect to the axis of the output shaft.

2. The arrangement structure of a speed-change cable according to claim 1, wherein the transmission is provided with a gear shift mechanism for changing the speed by the operation of the speed-change cable, said gear shift mechanism being disposed in front or above the transmission case.

3. The arrangement structure of a speed-change cable according to claim 1, wherein the speed-change cable extends in a substantially straight direction from the transmission to a speed-change handle for manually actuating a shifting of said transmission.

4. The arrangement structure of a speed-change cable according to claim 3, wherein the length of said speed-change cable is shortened due to the extension of the speed-change cable directly from the transmission to the speed-change handle in a substantially straight direction.

5. The arrangement structure of a speed-change cable according to claim 3, wherein the a lower section of the speed-change cable extends upwardly from the transmission in the substantially straight direction between a down tube and a main frame of the vehicle body, and a central section of the speed-change cable overlaps one side of the main frame, and upper section connects to where an upper end of the speed-change cable connects to the speed-change handle.

6. The arrangement structure of a speed-change cable according to claim 1, wherein said transmission case includes a left and a right portion and further including a derailleur operatively positioned within said transmission case for shifting gears of said transmission and further including bosses projecting inwardly from the left and right portions of the transmission case for mounting said derailleur.

7. The arrangement structure of a speed-change cable according to claim 6, wherein one end of said speed-change cable includes an enlarged portion for mating with said derailleur when operatively connected thereto.

8. The arrangement structure of a speed-change cable according to claim 1, and further including a seal member disposed in said through-hole for guiding said speed-change cable from said transmission case.

9. The arrangement structure of a speed-change cable according to claim 8, wherein said speed-change cable includes an outer cable and said outer cable is tightly retained by said seal member disposed in said through-hole.

10. An arrangement structure of a speed-change cable comprising:
   a primary frame of a vehicle body extending obliquely rearwardly and downwardly from a head pipe;
   a transmission case supported by the primary frame,
   the transmission case having an internal space accommodating a transmission having a derailleur, and
   the transmission including a pedal crankshaft and an output shaft having axes that are separate from each other;
   wherein the transmission case includes:
   a through-hole at a portion facing forward or upwardly of the vehicle body; and
   a speed-change cable for causing the transmission to change the speed, said speed change cable passes through the through-hole in a substantially straight line to a speed-change handle for manually actuating a shifting of said transmission,
   wherein the primary frame of the vehicle body includes a mainframe and a down tube extending from the head pipe rearwardly and downwardly substantially in parallel, said transmission case being disposed to overlap with at least part of the mainframe and the down tube in a side view, and the through-hole is provided at substantially the same distance from the mainframe and the down tube
   wherein one end of the speed-change cable is operatively connected to the derailleur in a position that is forward with respect to the axis of the pedal crankshaft and that is above the axis of the output shaft.

11. The arrangement structure of a speed-change cable according to claim 10, wherein the transmission is provided with a gear shift mechanism for changing the speed by the operation of the speed-change cable, said gear shift mechanism being disposed in front or above the transmission case.

12. The arrangement structure of a speed-change cable according to claim 10, wherein the speed-change cable is operatively connected to a derailleur and said speed-change handle and said speed-change cable extends in a substantially straight direction from the derailleur to the speed-change handle for manually actuating a shifting of said transmission.

13. The arrangement structure of a speed-change cable according to claim 12, wherein the length of said speed-change cable is shortened due to the extension of the speed-change cable directly from the derailleur to the speed-change handle in a substantially straight direction.

14. The arrangement structure of a speed-change cable according to claim 12, wherein the a lower section of the speed-change cable extends upwardly from the transmission in the substantially straight direction between a down tube and a main frame of the vehicle body, and a central section of the speed-change cable overlaps one side of the main frame, and upper section connects to where an upper end of the speed-change cable connects to the speed-change handle.

15. The arrangement structure of a speed-change cable according to claim 10, wherein said transmission case includes a left and a right portion and further including a derailleur operatively positioned within said transmission case for shifting gears of said transmission and further including bosses projecting inwardly from the left and right portions of the transmission case for mounting said derailleur.

16. The arrangement structure of a speed-change cable according to claim 15, wherein one end of said speed-change cable includes an enlarged portion for mating with said derailleur when operatively connected thereto.

17. The arrangement structure of a speed-change cable according to claim 10, and further including a seal member disposed in said through-hole for guiding said speed-change cable from said transmission case.

18. The arrangement structure of a speed-change cable according to claim 17, wherein said speed-change cable includes an outer cable and said outer cable is tightly retained by said seal member disposed in said through-hole.

19. An arrangement structure of a speed-change cable comprising:
 a primary frame of a vehicle body extending obliquely rearwardly and downwardly from a head pipe which rotatably supports a handle and a transmission case supported by the primary frame,
 the transmission case having an internal space accomodating a transmission having a derailleur, and
 the transmission including a pedal crankshaft and an output shaft having axes that are separate from each other;
 wherein the transmission case includes:
  a through-hole at a portion facing forward or upwardly of the vehicle body;
  a speed-change cable for causing the transmission to change the speed is passed through the through-hole; and
  a seal member disposed in said through-hole for guiding said speed-change cable from said transmission case
  wherein one end of the speed-change cable is operatively connected to the derailleur in a position that is forward with respect to the axis of the pedal crankshaft and above and rearward with respect to the axis of the output shaft.

20. The arrangement structure of a speed-change cable according to claim 1, wherein the primary frame of the vehicle body includes a mainframe and a down tube extending from the head pipe rearwardly and downwardly substantially in parallel, said transmission case being disposed to overlap with at least part of the mainframe and the down tube in a side view, and the through-hole having an upper end opening at substantially the same distance from the mainframe and the down tube.

21. The arrangement structure of a speed-change cable according to claim 10, wherein the primary frame of the vehicle body includes a mainframe and a down tube extending from the head pipe rearwardly and downwardly substantially in parallel, said transmission case being disposed to overlap with at least part of the mainframe and the down tube in a side view, and the through-hole having an upper end opening at substantially the same distance from the mainframe and the down tube.

* * * * *